United States Patent
Chen et al.

(10) Patent No.: US 9,973,244 B2
(45) Date of Patent: May 15, 2018

(54) DEVICE AND METHOD FOR MANAGING SPECTRUM RESOURCES, AND WIRELESS COMMUNICATION DEVICE AND METHOD

(71) Applicant: Sony Corporation, Tokyo (JP)

(72) Inventors: Jinhui Chen, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 191 days.

(21) Appl. No.: 14/935,660

(22) Filed: Nov. 9, 2015

(65) Prior Publication Data
US 2016/0156393 A1    Jun. 2, 2016

(30) Foreign Application Priority Data
Nov. 28, 2014  (CN) .......................... 2014 1 0708841

(51) Int. Cl.
*H04B 7/0413* (2017.01)
*H04W 72/04* (2009.01)
*H04B 7/04* (2017.01)
*H04W 72/08* (2009.01)

(52) U.S. Cl.
CPC ............ *H04B 7/0413* (2013.01); *H04B 7/04* (2013.01); *H04W 72/048* (2013.01); *H04W 72/082* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 2011/0080961 A1* | 4/2011 | Hui ...................... | H04B 7/024 375/259 |
| 2015/0373554 A1* | 12/2015 | Freda .................... | H04W 16/14 455/450 |
| 2017/0006475 A1* | 1/2017 | Liu ....................... | H04B 17/336 |

* cited by examiner

*Primary Examiner* — Christine Duong
(74) *Attorney, Agent, or Firm* — Oblon, McClelland, Maier & Neustadt, L.L.P.

(57) ABSTRACT

A device and method for managing spectrum resources and a wireless communication device and method are provided. The method for managing spectrum resources of a wireless communication system according to the disclosure includes: acquiring resource utilization parameter information of a communication device to be managed, the resource utilization parameter information including the number of antennas; and determining spectrum resource allocation to the communication device based on the resource utilization parameter information. The method for managing spectrum resources enriches contents of signaling interaction between a communication device and a device for managing spectrum resources in a wireless communication system, thereby making it possible to sufficiently utilize a possible spatial freedom degree of a communication device in a multi-antenna system, and to efficiently reduce interference between communication devices or communication systems.

19 Claims, 14 Drawing Sheets

DEVICE AND METHOD FOR MANAGING SPECTRUM RESOURCES, AND WIRELESS COMMUNICATION DEVICE AND METHOD

FIELD

The disclosure generally relates to the field of wireless communication, in particular to a device and a method for managing spectrum resources in a wireless communication system, and a communication device and a communication method in a communication system, and in particular to a device and a method for managing spectrum resources in a reconfigurable wireless communication system.

BACKGROUND

With rapid increasing in requirement of radio communication globally, various network providers focus on reconfigurable radio systems (RRS). RRS is a comprehensive concept. A RRS solution is based on, for example, a soft reconfiguration and cognitive radio technique by radio application. It aims at an ability to develop reconfiguration radio and develop a network adapted to an environment varying dynamically. In an aspect, RRS may be simply described as follows. To realize maximum spectrum resource utilization, under the premises of ensuring usage of spectrum of a primary system of a communication system, spectrum resources are allocated to a secondary system included in the communication system using a dynamic spectrum management manner. RRS can increase spectrum utilization significantly.

CR is an intelligent communication system which is perceptible of external communication environment. Briefly speaking, to increase spectrum utilization, a wireless communication device with cognitive capability may operate in a frequency band that has been authorized to another communication system in a certain "opportunistic" manner. Practically, this is possible only when the authorized frequency band has not been utilized or only a few communication services are active in the authorized frequency band. The available spectrum resources occurring in space domain, time domain and frequency domain is referred to as a "spectrum hole". A core concept of the CR is to enable the wireless communication device to have an ability to discover and utilize reasonably the "spectrum hole".

Nowadays, a critical technique for achieving the CR is a center server, such as a geolocation database (GLDB). Based on the protection requirement of the primary system and a geolocation of the secondary system which requests to utilize the spectrum resources, available spectrum resources, such as the available frequency band or the maximum transmission power, of the secondary system is calculated. The secondary system utilizes the spectrum resources in the authorization range of the GLDB, thereby reducing the requirement on the cognitive capability of the secondary system itself, and achieving opportunistic access of the secondary system while ensuring a normal operation of the primary system.

As another technique aiming to meet the requirement of the mobile communication system of high speed, large capacity, and reliable transmission, a multi-antenna (MIMO) system is also researched widely. Researches shows that, the MIMO system can provide larger capacity than the conventional single-antenna system, and the capacity of the MIMO system increases linearly with the number of antennas.

However, current CA is in an initial stage. A researcher generally pays attention to how to protect the primary system but neglect the communication quality requirement of the secondary system in a case where the spectrum resources are utilized opportunistically. In this context, the inventor of the disclosure provides prospectively how to achieve the efficiency utilization of the spectrum resources, which have been authorized to the primary system, by the secondary system based on the feature of the MIMO system.

SUMMARY

The brief summary of the disclosure is provided below, so as to provide basic understanding about some aspects of the disclosure. It should be understood that, this summary is not an exhaustive summary of the disclosure. It does not intend to determine the critical or important part of the disclosure, but does not intend to limit the scope of the disclosure. Its object is only to give some concepts in a simplified form, to serve as a preamble to the detailed description discussed later.

In an aspect of the disclosure, it is provided a device for managing spectrum resources in a wireless communication system, including: a parameter acquisition unit configured to acquire resource utilization parameter information of a communication device managed by the device for managing spectrum resources, where the resource utilization parameter information includes the number of antennas; and a resource allocation unit configured to determine spectrum resource allocation to the communication device based on the resource utilization parameter information.

In another aspect of the disclosure, it is provided a method for managing spectrum resources in a wireless communication system, including: acquiring resource utilization parameter information of a communication device to be managed, where the resource utilization parameter information includes the number of antennas; and determining spectrum resource allocation to the communication device based on the resource utilization parameter information.

In another aspect of the disclosure, it is provided a communication device in a wireless communication system, configured with multiple antennas, the communication device including: a parameter reporting unit configured to provide resource utilization parameter information of the communication device to a device for managing spectrum resources of the communication device, where the resource utilization parameter information includes the number of the multiple antennas; and an acquisition unit configured to acquire spectrum resources allocated by the device for managing spectrum resources.

In another aspect of the disclosure, it is provided a wireless communication method in a communication device configured with multiple antennas, including: providing resource utilization information of the communication device to a device for managing spectrum resources of the communication device, where the resource utilization parameter information includes the number of the multiple antennas; and acquiring spectrum resources allocated by the device for managing spectrum resources.

In another aspect of the disclosure, it is provided a communication device in a radio reconfigurable communication system, including: a parameter reporting unit configured to transmit resource utilization parameter information of the communication device to a device for managing spectrum resources of the communication device, where the resource utilization parameter information includes geolocation information of the communication device; and an acquisition unit configured to acquire, from the device for managing spectrum resources, geolocation information of adjacent communication devices of the communication device and spectrum resources of a primary system allocated by the device for managing spectrum resources, where the communication device utilizes the spectrum resources of the primary system in a condition of ensuring the communication quality of the primary system.

In another aspect of the disclosure, it is provided a communication method in a radio reconfigurable communication system, including: transmitting resource utilization parameter information of a communication device to a device for managing spectrum resources of the communication device, where the resource utilization parameter information includes geolocation information of the communication device; and acquiring, from the device for managing spectrum resources, geolocation information of adjacent communication devices of the communication device and spectrum resources of a primary system allocated by the device for managing spectrum resources, where the communication device utilizes the spectrum resources of the primary system in a condition of ensuring the communication quality of the primary system.

In another aspect of the disclosure, it is provided a device for managing spectrum resources in a radio reconfigurable communication system, including: a parameter acquisition unit configured to acquire resource utilization parameter information of a communication device managed by the device for managing spectrum resources, where the resource utilization parameter information includes geolocation information; a resource allocation unit configured to allocate spectrum resources of a primary system to the communication device, in a condition of ensuring the communication quality of the primary system, based on the resource utilization parameter information; an adjacent device determination unit configured to determine communication devices adjacent to each other among communication devices managed by the device for managing spectrum resources based on the geolocation information; and a notification unit configured to notify a resource allocation result determined by the resource allocation unit and geolocation information of the adjacent communication devices to a corresponding communication device.

In another aspect of the disclosure, it is provided a method of managing spectrum resources in a radio reconfigurable communication system, including: acquiring resource utilization parameter information of a managed communication device, where the resource utilization parameter information includes geolocation information; allocating spectrum resources of a primary system to the communication device, in a condition of ensuring the communication quality of the primary system, based on the resource utilization parameter information; determining communication devices adjacent to each other among the managed communication devices based on the geolocation information; and notifying a determined resource allocation result and geolocation information of the adjacent communication devices to a corresponding communication device.

In another aspect of the disclosure, it is provided a communication device in a wireless communication system, including: a transmission unit configured to transmit information on a geolocation and the number of antennas of the communication device to a device for managing spectrum resources of the wireless communication system.

In another aspect of the disclosure, it is provided a device for managing spectrum resources in a wireless communication system, including: a parameter reception unit configured to receive, from a communication device, information on a geolocation and the number of antennas of the communication device.

In another aspect of the disclosure, it is provided a device for managing spectrum resources in a wireless communication system, including one or more processors configured to: acquire resource utilization parameter information of a communication device managed by the device for managing spectrum resources, where the resource utilization parameter information includes the number of antennas; and determine spectrum resource allocation to the communication device managed by the device for managing spectrum resources, based on the resource utilization parameter information.

In another aspect of the disclosure, it is provided a communication device in a wireless communication system, configured with multiple antennas, the communication device including one or more processors configured to: include, in resource utilization parameter information of the communication device, the number of antennas of the multiple antennas, to be used by a device for managing spectrum resources of the communication device; and acquire spectrum resources allocated by the device for managing spectrum resources based on the resource utilization parameter information.

In various aspects of the disclosure, contents of signaling interaction between a communication device and a device for managing spectrum resources in a wireless communication system are enriched, thereby to sufficiently utilize a possible spatial freedom degree of a communication device in a multi-antenna system, and in turn to efficiently reduce interference between communication devices or communication systems.

BRIEF DESCRIPTION OF THE DRAWINGS

Referring to the description of the embodiments of the disclosure in conjunction with the drawings, the above and other objects, features and advantages of the disclosure will be understood more easily. In the drawings, identical or corresponding reference numbers are adopted to represent identical or corresponding technical features or components. In the drawings, the size and the relative position of the unit are not necessarily drawn proportionally.

DETAILED DESCRIPTION OF THE EMBODIMENTS

Figure 1:
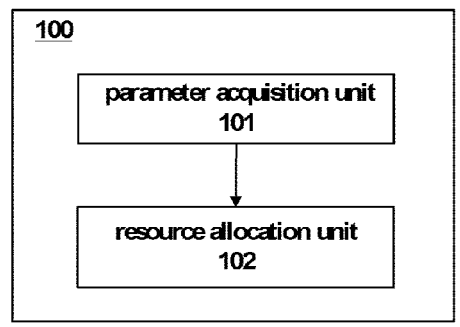
FIG. 1 is a block diagram illustrating the structure of a device for managing spectrum resources in a wireless communication system according to an embodiment of the disclosure.

Hereinafter, exemplary embodiments of the disclosure will be described in conjunction with the drawings. For clarity and concise, not all features of the practical embodiments are described in the specification. However, it should be understood that, many embodiment-specific decisions must be made during the development of any of the practical embodiments, so as to achieve the specific object of the developer. For example, to be coincidence with restrictions related to systems and services, and these restrictions varies with different embodiments. Further, it is to be understood that, while the development work may be very complicated and time-consuming, it is only a routine task for those skilled in the art benefiting from the disclosure.

Here, it is further to be noted that, only device structures and/or process steps closely related to the solutions according to the disclosure are illustrated in the drawings, and other details less closely related to the disclosure are omitted, thereby preventing the disclosure from being obscured due to unnecessary details.

In a conventional radio reconfigurable system (RRS), mutual interference of co-frequency transmission may exist between adjacent access points due to asynchrony of respective wireless access points and deficiencies in the signaling. The mutual interference between adjacent access points includes the interference of the downlink to the uplink, the interference of the downlink to the downlink, the interference of the uplink to the uplink, and the interference of the uplink to the downlink. So far, no solution has been proposed in which the spectrum resources are allocated to the adjacent access points based on the possible spatial freedom of the wireless access point, such as the number of antennas of the wireless access point. Further, in the conventional technical solutions, adjacent access points do not know the geolocation of each other. The interference elimination between the adjacent access points does not take into consideration the effect of the geolocations of the adjacent access points.

To improve spectrum utilization and reducing mutual interference between adjacent wireless access points, it is desired to provide a device for managing spectrum resources, a method for managing spectrum resources, a wireless communication device and a wireless communication method, which takes into consideration both the antenna arrangement of the access point (specifically, the number of the antennas) and the spectrum resource management scheme.

FIG. 1 is a block diagram illustrating the structure of a device 100 for managing spectrum resources in a wireless communication system according to an embodiment of the disclosure. The device 100 for managing spectrum resources includes a parameter acquisition unit 101 and a resource allocation unit 102.

The parameter acquisition unit 101 is configured to acquire resource utilization parameter information of a communication device managed by the device 100 for managing spectrum resources. Here, depending on an application scene, the device 100 for managing spectrum resources may be implemented as a spectrum coordinator, a combination of a geolocation database (GLBS) and a spectrum coordinator, a base station, a center server or the like. Accordingly, the communication device may be implemented as a small cell base station, a wireless access point, a user equipment (UE) or the like.

In a specific example, the device 100 for managing spectrum resources is implemented as a spectrum coordinator, and the communication device is implemented as a WiFi access device having a cognitive radio function. Specifically, the WiFi device performs WiFi communication with a slave device thereof opportunistically by using the spectrum resources in the radio and television frequency band or the radar frequency band under the management of the spectrum coordinator.

Figure 18:
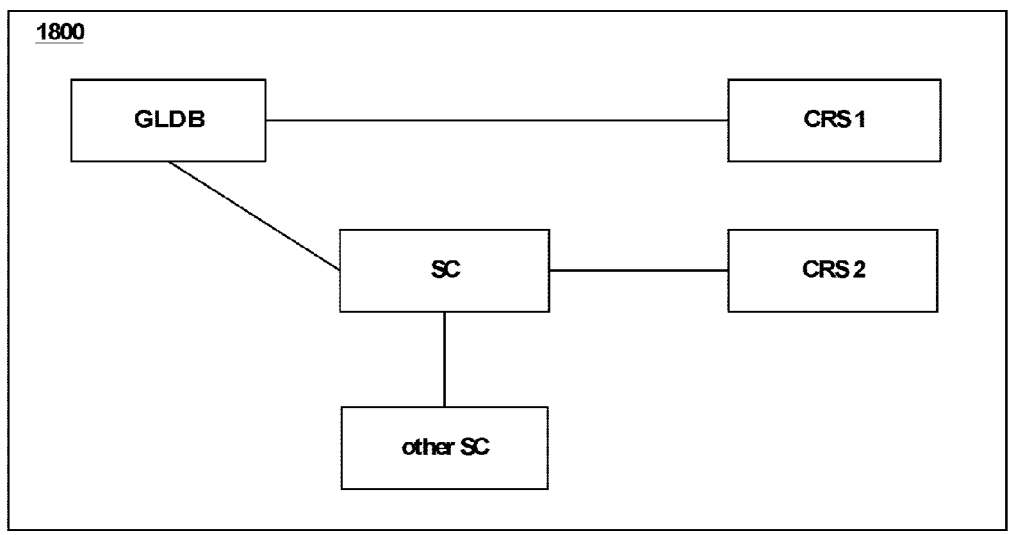
FIG. 18 is a block diagram illustrating an illustrative configuration of a wireless communication system including a primary system and a secondary system.

The disclosure may be based on, for example, the existing functional module relation in the TS 103 145 standard. For example, FIG. 18 is a block diagram illustrating an illustrative configuration of a wireless communication system 1800 including a primary system and a secondary system. The wireless communication system 1800 may include one or more geolocation database (GLDB), one or more spectrum coordinator (SC) and multiple cognitive radio systems (SC) (which is denoted by CRS1 and CRS2 in FIG. 18). Specifically, the GLDB and the SC constitute the primary system, and the multiple CRSs constitute the secondary system. In the wireless communication system 1800, the device for managing spectrum resources according to the disclosure (such as the device 100 for managing spectrum resources) may be implemented as a separate SC, or may be implemented as a combination of the GLDB and the SC; and the wireless communication device according to the disclosure (such as a communication device 500 corresponding to the device 100 for managing spectrum resources as described below) may be implemented as an access point in at least one of the CRSs or the like.

In another specific example, the device 100 for managing spectrum resources is implemented as an eNB, and the communication device is implemented as a small cell base station having a cognitive radio function. Specifically, the small cell base station performs cellular communication with a slave device thereof, such as a UE, opportunistically by using the spectrum resources in the WiFi frequency band under the management of the eNB.

The resource utilization parameter information of the communication device is the related information to be used by the device 100 for managing spectrum resources to perform resource allocation and resource management on the communication device. The resource utilization parameter information includes the number of antennas of the communication device. Depending on the type or requirement of the communication system in which the communication device is applied, the resource utilization parameter information may further include, for example, the geolocation of the communication device and the like.

The parameter acquisition unit 101 of the device 100 for managing spectrum resources may receive the resource utilization parameter information including the number of antennas from the communication device, for example, a wireless access point. The communication device may report the resource utilization parameter information, for example, by using a wireless reconfigurable system capability information element in a spectrum request message.

Figure 19:
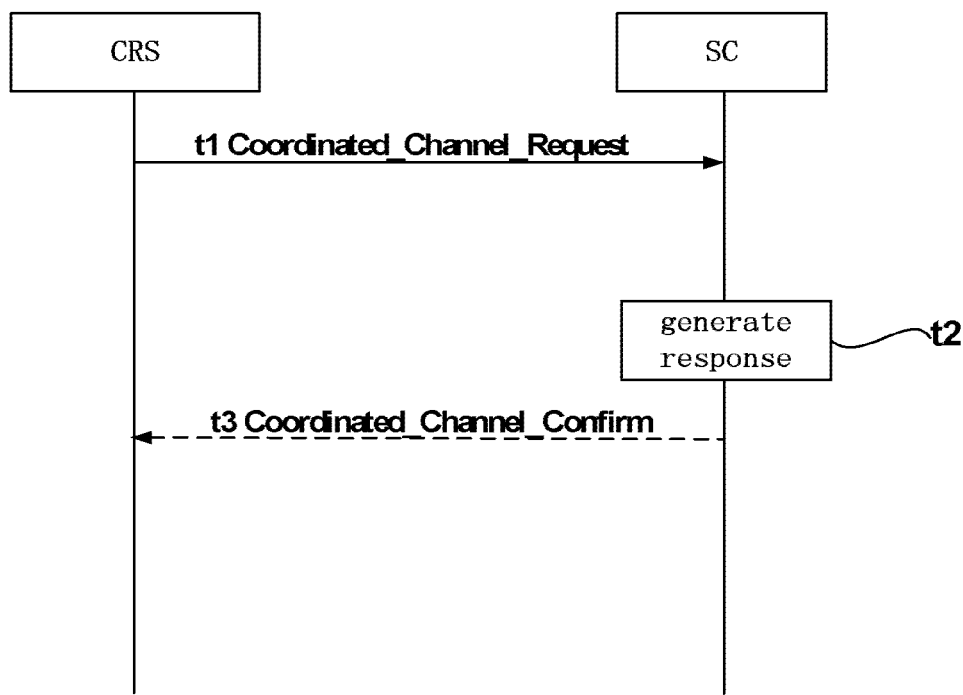
FIG. 19 is a sequence diagram illustrating interactions between a device for managing wireless resources and a communication device according to an embodiment of the disclosure.

FIG. 19 is a sequence diagram illustrating interactions between a device for managing wireless resources and a communication device according to an embodiment of the disclosure. As shown in FIG. 19, at time t1, the CRS, which is an exemplary implementation of the communication device, transmits a coordinated channel request (Coordinated_Channel_Request) to the SC, which is an exemplary implementation of the device for managing spectrum resources. The request command includes the resource utilization parameter information of the CRS communication device (which is the "device capacity" information listed below). According to an embodiment of the disclosure, the resource utilization parameter information includes the number of antennas. The "wireless reconfigurable system capability information element" mentioned above may be implemented as the "device capability" information. As an example, the code below explains the definition of the "device capability".

```
//DeviceCapacity: Device capability
DeviceCapability ::= SEQUENCE{
//numberOfAntennas: The number of antennas of the CRS that
   perform the request numberOfAntennas :INTEGER;
/*accessRoutingEnabled: The capability to access the GLDB
via another CRS. 0 indicates that it can not access the GLDB
via another CRS; and 1 indicates that it can access
the GLDB via another CRS*/
accessRoutingEnabled:BOOLEAN;
//routeCRS: The routing information for accessing the GLDB
routeCRS:IPAddress;
//priorityAccessTrue: The priority access of the CRS
priorityAccessTrue:BOOLEAN;
//expectedQoS: The expected service quality of the priority access
expectedQoS:QoS;
}
```

The SC, which is an exemplary implementation of the device for managing spectrum resources, generates response information at time t2, and transmits, at time t3, the generated response information (Coordinated_Channel_Confirm) to the CRS, which is an exemplary implementation of the communication device.

Referring back to FIG. 1, the resource allocation unit 102 is configured to determine spectrum resource allocation to the communication device based on the resource utilization parameter information. For example, assuming that the resource utilization parameter information includes the information on the number of antennas and the geolocation of the communication device, the resource allocation unit 102 may firstly determine available spectrum resources of the communication device based on the received geolocation of the communication device. Then, the resource allocation unit 102 may further determine the allocation of the spectrum resources based on the number of antennas of the adjacent communication device.

Specifically, but not limited thereto, the resource allocation unit 102 may be configured to: determine, based on the number of antennas of a communication device, interference elimination capability of the communication device, and determine, based on the interference elimination capability of the communication device, the number of other communication devices within the region where the communication device is located, which are enabled to use spectrum resources overlapping with those used by the communication device. On the other hand, the resource allocation unit 102 may also determine, based on the interference elimination capability of the communication device in conjunction with the geolocation distance or the priority level of the resource utilization, which of the communication devices within the region where the communication device is located are not enabled to use spectrum resources overlapping with those used by the communication device. The "overlapping spectrum resources" here is, for example, a non-completely overlapping and/or completely overlapping (i.e., coincide) spectrum resources. Preferably, the "overlapping spectrum resources" are the spectrum resources in the same frequency band.

For a communication device with M antennas, it may be considered that the communication device have M spatial freedom degrees. Generally, the communication device retains at least one spatial freedom degree for providing services to the user equipment (UE) thereof. Thus, the communication device has at most M−1 spatial freedom degrees for processing the interference. In other words, in a case that the number of antennas obtained by the parameter acquisition unit 101 is M, the resource allocation unit 102 determines that the communication device can at most eliminate interference between the communication device and M−1 other communication devices. Further, the communication device may further report the number of UEs that are served by the communication device or the upper limit of the number of UEs that can be served by the communication device, and the resource allocation unit 102 determines the interference elimination capability of the communication device based on the number of antennas and the number of the UEs served by the communication device. For example, in a case that the communication device is a wireless access point in the reconfigurable wireless system and there are three UEs in the coverage of the communication device, the communication device can eliminate the interference between the communication device and M−3 other communication devices. In another example, the communication device may directly report the current interference elimination capability thereof or the left spatial freedom degree, and the device 100 for managing spectrum resources may allocate the resources in the same frequency band to other communication device based on the specific interference elimination capability/the left spatial freedom degree.

Thus, the resource allocation unit 102 may determine other communication devices, the number of which is smaller than the number of antennas (which is, for example equal to or less than M−1), from among communication devices managed by the device 100 for managing spectrum resources, and allocates overlapping spectrum resources to the determined communication devices. In an example, in a case that a new communication device requests the spectrum resources, the resource allocation unit 102 determines the number of the communication devices, from among the communication devices within the geographical region where the communication device is located, which have occupied currently a certain frequency band, determines the number of antennas of each of these communication devices, and determines, based on the number of antennas, whether to allocate this frequency band to the new communication device.

Practically, for multiple communication devices within a predetermined region, the numbers of antennas of the communication devices are not necessarily identical. In this case, the resource allocation unit 102 may be configured to determine spectrum resource allocation to the multiple communication devices, based on the smallest one of the numbers of antennas of the multiple communication devices.

The device 100 for managing spectrum resources and the method for managing spectrum resources used by the device for managing spectrum resources may be applied in the system with any number of antennas, to achieve the spectrum resource allocation and management based on the number of antennas. Hereinafter, the description of the application is given in the context of the RRS.

In a case that the device 100 for managing spectrum resources is applied in the RRS, the resource allocation unit 102 may allocate spectrum resources of a primary system to the communication device, in a condition of ensuring the communication quality of the primary system, to multiplex the spectrum resources. For example, as mentioned in the above example, the resource utilization parameter information acquired by the parameter acquisition unit 101 may further include geolocation information of the communication device. The parameter acquisition unit 101 may receive the geolocation information from the communication device by using, for example, the spectrum request message in the ETSI RRS standard series. The resource allocation unit 102 may determine, based on the geolocation information, available spectrum resources of the communication device managed by the device 100 for managing spectrum resources. For example, in the example in which the device 100 for managing spectrum resources is implemented as a spectrum coordinator, the resource allocation unit 102 may transmit the geolocation information to the GLDB, and receive, as the available spectrum resources, the spectrum resources calculated by the GLDB based on the protection requirement of the primary system. As another example, the spectrum coordinator determines the above available spectrum resources based on the spectrum resources feedback by the GLDB in conjunction with other factors taken into consideration in the conventional art, such as aggregation interference. After the available spectrum resources of the communication device is determined based on the geolocation information, the device 100 for managing spectrum resources may determine the number of the communication devices (the secondary systems) that can use the same resources. For a specific communication device, in a case that the number of the adjacent communication devices of the communication device is greater than the number of antennas of the communication device, the available spectrum resources may be allocated to the adjacent communication devices (the secondary systems) in a frequency-division manner or a time-division manner.

Figure 2:
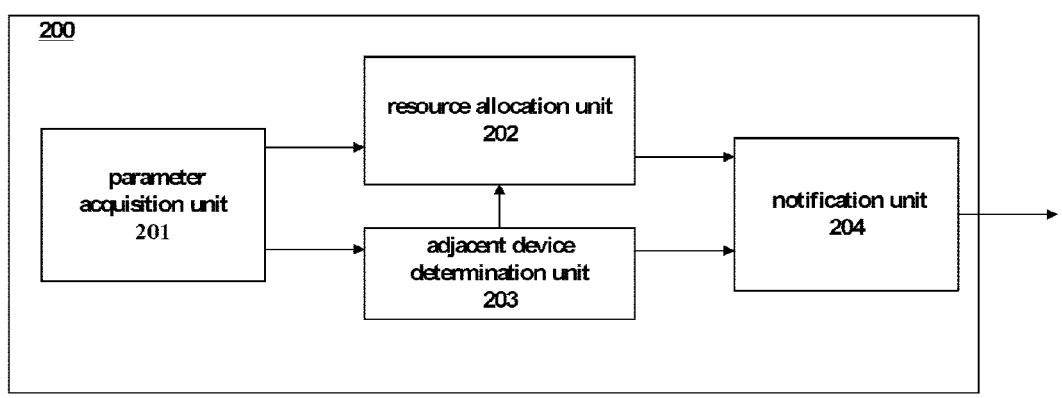
FIG. 2 is a block diagram illustrating the structure of a device for managing spectrum resources according to another embodiment of the disclosure.

FIG. 2 is a block diagram illustrating the structure of a device for managing spectrum resources 200 according to another embodiment of the disclosure. The device for managing spectrum resources 200 includes a parameter acquisition unit 201, a resource allocation unit 202, an adjacent device determination unit 203 and a notification unit 204. The parameter acquisition unit 201 and the resource allocation unit 202 have the same structures with the parameter acquisition unit 101 and the resource allocation unit 102 described referring to FIG. 1, respectively, and have the same functions with the parameter acquisition unit 101 and the resource allocation unit 102, respectively. The descriptions of the same components are omitted hereinafter.

The adjacent device determination unit 203 may determine, based on the geolocation information acquired by the parameter acquisition unit 201, communication devices adjacent to each other among the communication devices managed by the device for managing spectrum resources 200. The adjacent communication devices are the communication devices which are adjacent to the communication device geographically and possibly use overlapping spectrum resources. For example, but not limited thereto, the adjacent device determination unit 203 may find the adjacent communication device of each communication device by calculating the interference level between the communication devices (such as the path loss or the visibility range) based on the geolocations of the communication devices and the geographic data previously stored by the device for managing spectrum resources 200 (such as the geolocations of other registered communication devices, the terrain of the managed region/the wireless transmission model). For example, the pre-estimated path loss value is compared with the empirical threshold value, and the communication device with the path loss value greater than the empirical threshold value is determined as the adjacent communication device.

The notification unit 204 may notify the available spectrum resources of a communication device and the geolocation information of the adjacent communication devices of the communication device to the communication device. The notification unit 204 may notify the geolocation information of the adjacent communication devices of the communication device to the communication device by using, for example, the spectrum request response message in the ETSI RRS standard series. In an example, the notification unit 204 may notify the geolocation information of the adjacent communication devices, the number of which is smaller than the number of antennas of the corresponding communication device, to the corresponding communication device. For example, in a case that the communication includes M antennas, the notification unit 204 may notify the geolocation information of the first M−1 (or less) adjacent communication devices, which are sorted in a descending order of the interference level/in an ascending order of the distance from the adjacent communication device to the communication device, to the corresponding communication device. Optionally, the notification unit 204 may notify the geolocation information of all the adjacent communication devices to the communication device in an ascending order of the distance. Based on the interference elimination capability thereof and the load, the wireless communication device determines interferences of which objects are to be eliminated. Optionally, the notification unit 204 may notify, as required, the geolocation information of only the adjacent communication devices, which use the overlapping spectrum resources with the communication device, to the communication device. Alternatively, the notification unit 204 may notify the geolocation information and the allocated resources of all the adjacent communication devices to the communication device.

In a case that the notification unit 204 notifies the geolocation information of the adjacent communication devices of the communication device to the communication device, the communication device may perform the uplink and downlink interference elimination by using the received geolocation information of the adjacent communication devices. In a case that the notification unit 204 does not notify the geolocation information of the adjacent communication devices to the communication device, the communication device determines the interference channel by using a sensing method, and thus performs the elimination. This will be described in the detailed description of the communication device according to the disclosure hereinafter.

Figure 3:
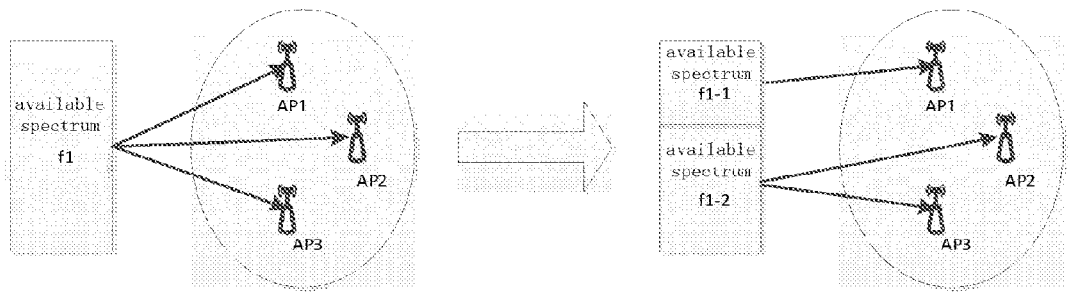
FIG. 3 is a schematic diagram illustrating an embodiment of allocating the available spectrum resources to communication devices at adjacent geolocations based on the number of antennas.

In an embodiment, the resource allocation unit 202 may also allocate the available spectrum resources to communication devices at adjacent geolocations based on the number of antennas. FIG. 3 is a schematic diagram illustrating an embodiment of a process for allocating the available spectrum resources to communication devices at adjacent geolocations based on the number of antennas.

The resource allocation unit 202 may divide the available spectrum resources into multiple resource parts, and allocates the multiple resource parts according to the number of antennas of each of the adjacent communication devices, in a case where the number of the adjacent communication device is larger than the number of antennas of one of the adjacent communication devices. In the example shown in FIG. 3, for example, the access points AP1-AP3 in the reconfigurable wireless system are determined as the adjacent access points. In this case, the gelocation database (GLDB), which is a component of the device for managing spectrum resources or the source of the external information, determines simply based on the geolocation that the available spectrums of the three access points may be the same, which each are f1. In the conventional art, if f1 is allocated to the AP1-AP3, co-frequency interference may be caused. However, according to the disclosure, the resource allocation unit 202 allocates the resources based on the number of antennas. If it is known that the AP1 includes a single antenna, the AP2 includes two antennas, and the AP3 includes three antennas, the resource allocation unit 202 may divide the available spectrum f1 into f1-1 and f1-2 for example by a frequency-division manner. In the region in which the AP1-AP3 are located, since the AP1 includes a single antenna, and the AP1 can not multiplex the resources with another AP, thus the f1-1 is allocated to the AP1 separately; the minimum of the numbers of antennas of the AP2 and the AP3 is 2, thus the AP2 and the AP3 may multiplex f1-2. The co-frequency interference between the AP2 and the AP3 may be eliminated for example by using the MIMO pre-coding.

Figure 4:
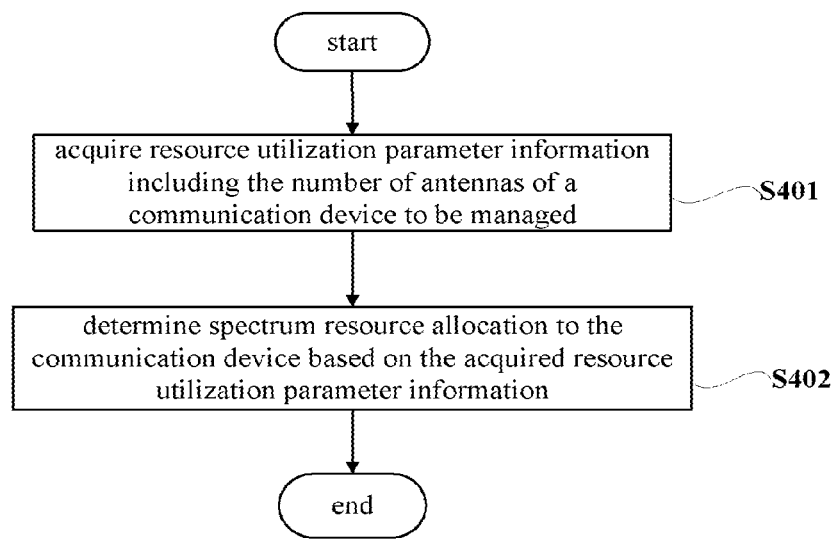
FIG. 4 is a flow chart illustrating a method for managing spectrum resources in a wireless communication system according to an embodiment of the disclosure.

FIG. 4 is a flow chart illustrating a method for managing spectrum resources in a wireless communication system according to an embodiment of the disclosure. In step S401, resource utilization parameter information of a communication device to be managed is acquired. The resource utilization parameter information includes the number of antennas of the communication device. In step S402, spectrum resource allocation to the communication device is determined based on the resource utilization parameter information. The specific details of the method have been described in the detailed description of the device for managing spectrum resources according to the disclosure described referring to FIG. 1 to FIG. 3 above, and are not repeated here.

Figure 5:
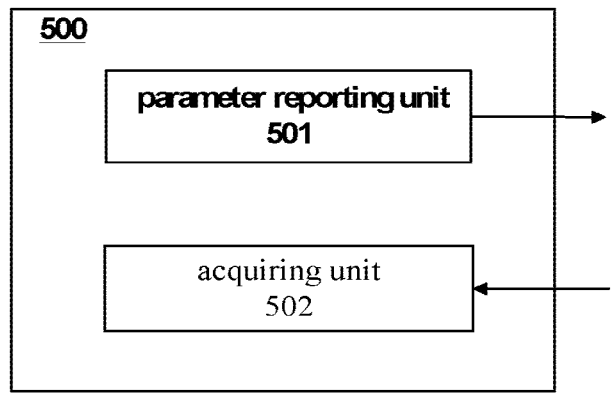
FIG. 5 is a structural block diagram illustrating a communication device for a wireless communication system according to an embodiment of the disclosure.

FIG. 5 is a block diagram illustrating the structure of a communication device 500 in a wireless communication system according to an embodiment of the disclosure. The wireless communication device 500 is configured with multiple antennas, and may be used in conjunction with the device for managing spectrum resources described referring to FIG. 1 to FIG. 3 above. Depending on the application scene, the wireless communication device 500 may be implemented as a small cell base station, a wireless access point or even a UE.

As shown in the drawing, the wireless communication device 500 includes a parameter reporting unit 501 and an acquisition unit 502. The parameter reporting unit 501 is configured to provide resource utilization parameter information of the communication device 500 to a device for managing spectrum resources of the communication device 500. The resource utilization parameter information includes the number of antennas in the antenna array provided in the communication device 500. Specifically, the parameter reporting unit 501 may provide the information on the number of antennas in the resource utilization reference information to the device for managing spectrum resources of the wireless communication system, in which the communication device is located, by using, for example, the spectrum request message in the ETSI RRS standard series. In an optional example, the resource utilization reference information further includes the number of UEs that are currently served by the communication device or the upper limit/capability of the number of UEs that can be served by the communication device. In another optional example, the resource utilization reference information includes the interference elimination capability or the left spatial freedom degree of the communication device, such as the interference elimination capability of the communication device determined based on the number of antennas of the communication device and the number of the UEs served by the communication device. When the device for managing spectrum resources determines and transmits the allocated spectrum based on the received resource utilization reference information, the acquisition unit 502 is configured to acquire spectrum resources transmitted by the device for managing spectrum resources.

Figure 6:
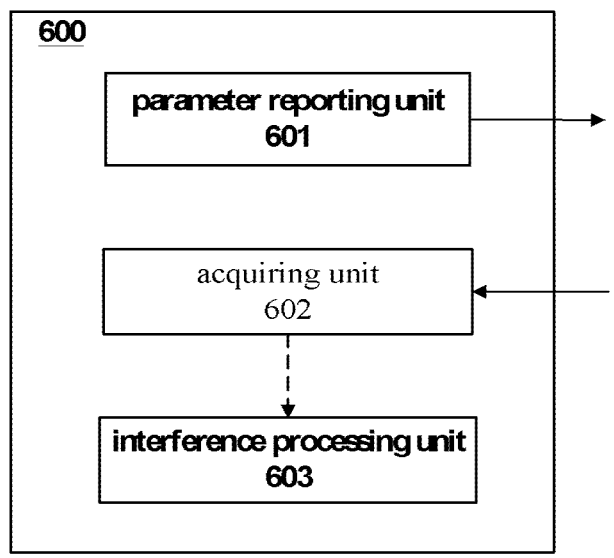
FIG. 6 is a block diagram illustrating the structure of a wireless communication device according to another embodiment of the disclosure.

FIG. 6 is a block diagram illustrating the structure of a wireless communication device 600 according to another embodiment of the disclosure. The wireless communication device 600 is configured with multiple antennas, and includes a reference reporting unit 601, an acquisition unit 602 and an interference processing unit 603. The reference reporting unit 601 and the acquisition unit 602 have the same structures with the parameter reporting unit 501 and the acquisition unit 502 described referring to FIG. 5, respectively, and have the same functions with the parameter reporting unit 501 and the acquisition unit 502, respectively. The descriptions of the same components are omitted hereinafter.

The interference processing unit 603 may determine an interference channel on the spectrum resources, and to perform interference processing using the multiple antennas in the wireless communication device 600 based on the interference channel.

In an example, the interference processing unit 603 may include an interference sensing unit (not shown). The interference sensing unit may sense interference in a radio environment where the communication device is located, and determine the interference channel based on a result of the sensing. The interference channel may be determined by those skilled in the art based on the result of the sensing by using various methods in the art.

As another example, the acquisition unit 602 may acquire geolocation information of adjacent communication devices of the communication device 600 from the device for managing spectrum resources. For example, the acquisition unit 602 may receive geolocation information of adjacent communication devices from the device for managing spectrum resources, for example, by using the spectrum request response message. In this case, the interference processing unit 603 may further include an interference calculation unit (not shown). The interference calculation unit may calculate the interference channel based on the geolocation information of the adjacent communication devices and the configuration of the multiple antennas (such as the type of the antenna array or the spacing of the antenna).

For example, the interference calculation unit may calculate an arrival angle and a departure angle according to a relative direction between the communication device and the adjacent communication devices, and calculates vectors of uplink and downlink interference channels according to the arrival angle and the departure angle.

For the uplink interference channel vector, in an example, if the arrival angle of the n-th adjacent communication device of the communication device 600 is denoted as $\alpha_n$, then for the uniform linear antenna array, the uplink interference channel vector $h_{i,n}^{ul}$ may be denoted as:

$$h_{i,n}^{ul} = \left[1, e^{-j2\pi\theta_n^{ul}}, \ldots, e^{-j2\pi(M-1)\theta_n^{ul}}\right]^T, \quad (1)$$

where $$\theta_n^{ul} = \frac{d\sin(\alpha_n)}{\lambda^{ul}},$$

d is the antenna spacing, $\lambda^{ul}$ is the uplink carrier wavelength, and M is the number of antenna elements of the communication device 600.

For the downlink interference channel vector, in another example, if the departure angle of the n-th adjacent communication device of the communication device 600 is denoted as $\beta_n$, then for the uniform linear antenna array, the uplink interference channel vector $h_{i,n}^{dl}$ may be denoted as:

$$h_{i,n}^{dl} = [1, e^{-j2\pi\theta_n^{dl}}, \ldots, e^{-j2\pi(M-1)\theta_n^{dl}}] \quad (2),$$

where $$\theta_n^{dl} = \frac{d\sin(\beta_n)}{\lambda^{dl}},$$

d is the antenna spacing, $\lambda^{dl}$ is the downlink carrier wavelength, and M is the number of antenna elements of the communication device 600.

In some examples, the value of the arrival angle may be deemed as the value of the departure angle.

In other examples, if the communication device is configured with other non-uniform linear antenna arrays, the uplink interference channel vector $h_{i,n}^{ul}$ and the downlink interference channel vector $h_{i,n}^{dl}$ may be calculated based on the arrangement of the antenna elements.

Figure 7:
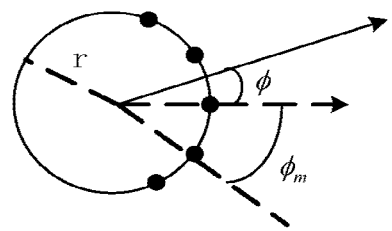
FIG. 7 is a schematic diagram illustrating a non-uniform linear antenna array with which the communication is configured.

FIG. 7 is a schematic diagram illustrating a non-uniform linear antenna array with which the communication device is configured. As shown, the communication device is configured with a circular array with a radius of r. The receiving and transmitting waves of the communication device are in the same plane with the circular array. The angle of the m-th antenna array element relative to the antenna array axis is $\varphi_m$, and the departure angle is $\varphi$. The downlink interference channel vector $h_i^{dl}$ may be denoted as:

$$h_i^{dl} = \left[e^{-j2\pi\frac{r\cos(\varphi-\varphi_m)}{\lambda^{dl}}}\right]_{m=0,\ldots,M-1}, \quad (3)$$

where $\lambda^{dl}$ is the downlink carrier wavelength, and M is the number of the antenna elements of the communication device.

The interference processing unit 603 may further include a transmitting matrix generation unit (not shown). The transmitting matrix generation unit may generate at least one of an uplink receiving matrix and a downlink pre-coding matrix based on a user channel of a user equipment served by the communication device 600 and the interference channel.

In a scene, the communication device 600 may be a service node device. The communication device 600 may further include a transmission unit. The transmission may be configured to perform radio transmission with a corresponding user equipment using the spectrum resources according to at least one of the uplink receiving matrix and the downlink pre-coding matrix.

The interference processing unit 603 may choose a part of the interference channels according to a channel condition and a scheduling state of a UE currently served by the communication device 600 to perform the interference processing. If the number of antennas of the communication device 600 is M, and the number of UEs currently served by the communication device 600 is 3, the communication device 600 may performs the interference elimination on the M−3 most adjacent access points In a case that the communication device 600 is used in a radio reconfigurable communication system, the spectrum resources acquired by the acquisition unit 602 is spectrum resources of a primary system. The communication device 600 utilizes the spectrum resources in a condition of ensuring the communication quality of the primary system.

Figure 8:
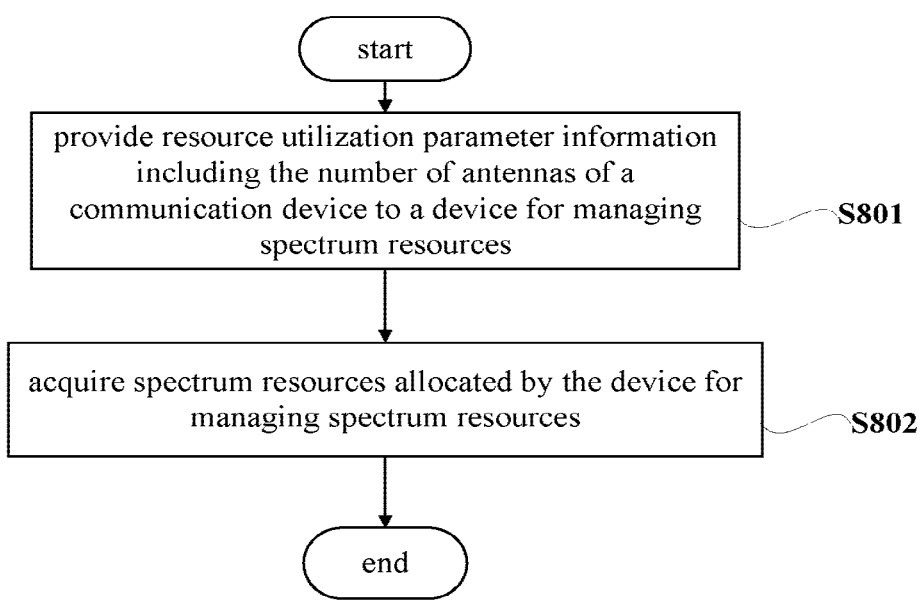
FIG. 8 is a flow chart illustrating a wireless communication method used in a communication device configured with multiple antennas according to an embodiment of the disclosure.

FIG. 8 is a flow chart illustrating a wireless communication method used in a communication device configured with multiple antennas according to an embodiment of the disclosure. In step S801, resource utilization information of the communication device is provided to a device for managing spectrum resources of the communication device. The resource utilization parameter information includes the number of the multiple antennas. In step S802, spectrum resources allocated by the device for managing spectrum resources are acquired. The specific details of the method have been described in the detailed description of the communication device according to the disclosure described referring to FIG. 5 to FIG. 7 above, and are not repeated here.

It is to be noted that, instead of or in addition to the number of antennas, the resource utilization parameter information transmit to the device for managing spectrum resources by the communication device may include an identifier for indicating whether the communication device will perform the interference elimination/pre-elimination process by using the multiple antennas, and/or a parameter for indicating how many co-frequency adjacent communication devices may be performed with the interference elimination/pre-elimination process (such as the number of the served UEs and the left spatial freedom degree). The identifier and the parameter may be sent to the device for managing spectrum resources via the wireless reconfigurable system capability element in the spectrum request message.

Figure 9:
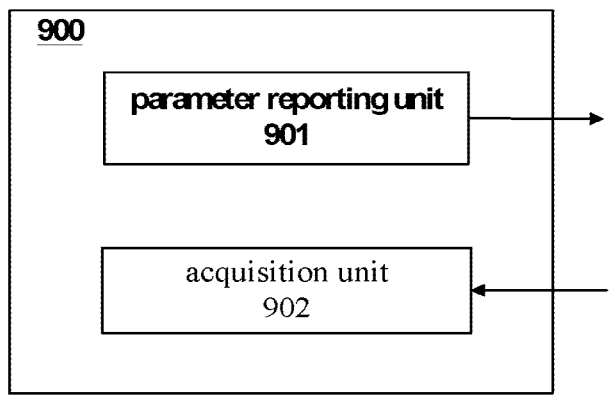
FIG. 9 is a block diagram illustrating the structure of a communication device for a radio reconfigurable communication system according to the disclosure.

FIG. 9 is a block diagram illustrating the structure of a communication device 900 in a radio reconfigurable communication system according to the disclosure. The communication device 900 includes a parameter reporting unit 901 and an acquisition unit 902. The parameter reporting unit 901 transmits resource utilization parameter information of the communication device 900 to a device for managing spectrum resources of the communication device 900. The resource utilization parameter information includes geolocation information of the communication device. The acquisition unit 902 acquires, from the device for managing spectrum resources, geolocation information of adjacent communication devices of the communication device 900 and spectrum resources of a primary system allocated by the device for managing spectrum resources. The communication device 900 utilizes the spectrum resources of the primary system in a condition of ensuring the communication quality of the primary system. In this embodiment, based on the interference elimination capability thereof, the communication device 900 may perform the interference elimination by using the geolocation information of the adjacent communication devices of the communication device 900 received from the device for managing spectrum resources.

Preferably, the resource utilization parameter information further includes the number of antennas/the interference elimination capability of the communication device, and the acquisition unit 902 may acquire the geolocation information of the adjacent communication devices, the number of which is less than the number of antennas, from the device for managing spectrum resources/the device for managing geolocations, thereby reducing redundant information between the communication and the device for managing spectrum resources/the device for managing geolocations, and saving the signaling resources.

In an embodiment, the device for managing spectrum resources that provides the geolocation of the adjacent communication device may be replaced by the device for managing geolocation that does not perform the spectrum coordination. In other words, in this example, the spectrum utilization ratio is improved only by the interference elimination process of the communication device itself without the optimization process at the initial resource allocation. Accordingly, the communication device may acquire the spectrum resources from the conventional device for managing spectrum resources, and acquires the gelocation of the adjacent communication device from the device for managing geolocation. For example, the device for managing geolocation provide, to the communication device, the geo- locations of all or predetermined number (which is determined based on the empirical value) of adjacent communication devices, which use the overlapping resources, or the geolocations of all the adjacent communication devices and the spectrums used (especially in the scene with sparse arrangement). The subsequent interference elimination process of the communication device may be the same as that described in the above embodiment, and is not described in detail.

For example, it may be provided such a device for managing geolocation in a wireless communication system. The device for managing geolocation may include a location acquisition unit, an adjacent device determination unit and a notification unit. The location acquisition unit is configured to acquire the geolocation information of the communication device managed by the device for managing geolocation. The adjacent device determination unit is configured to determine, based on the geolocation information, the gelocation of the adjacent communication device of the communication device, which use the overlapping spectrum resources. The notification unit is configured to notify the determined geolocation to the communication device.

Accordingly, the communication device may be implemented as a wireless communication device which is configured with multiple antennas and includes a location reporting unit, an adjacent device location acquisition unit and an interference processing unit. The location reporting unit is configured to report the geolocation information of the communication device to the device for managing geolocation. The adjacent device location acquisition unit is configured to obtain, from the device for managing geolocation, the gelocation of the adjacent communication device of the communication device, which use the overlapping spectrum resources. The interference processing unit is configured to determine the interference channel based on the geolocation of the adjacent communication device and perform the interference process by using the multiple antennas based on the interference channel.

Figure 10:
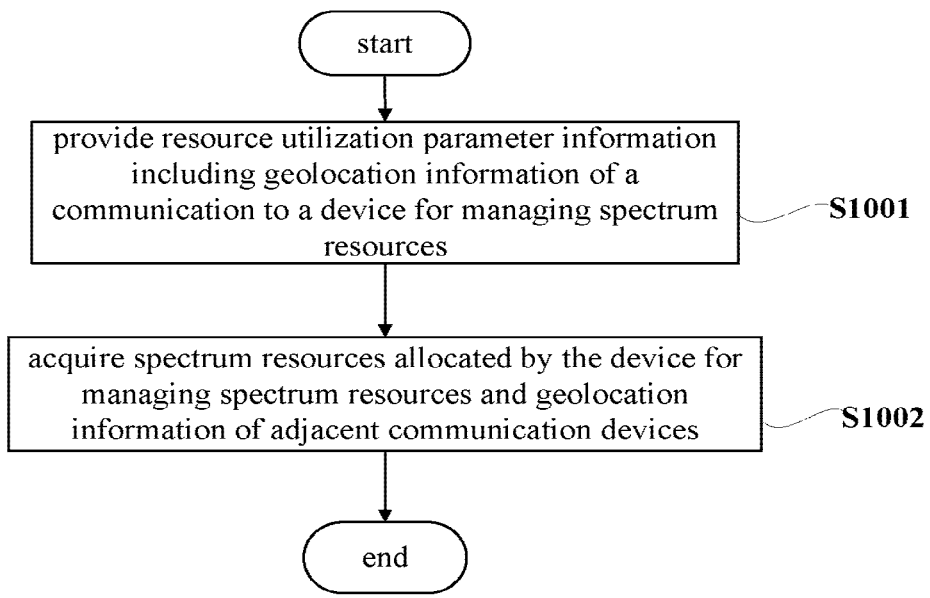
FIG. 10 is a flow chart illustrating a communication method used in a radio reconfigurable communication system according to an embodiment of the disclosure.

FIG. 10 is a flow chart illustrating a communication method used in a radio reconfigurable communication system according to an embodiment of the disclosure. In step S1001, resource utilization parameter information of a communication device is transmitted to a device for managing spectrum resources of the communication device. The resource utilization parameter information includes geolocation information of the communication device. In step S1002, geolocation information of adjacent communication devices of the communication device and spectrum resources of a primary system allocated by the device for managing spectrum resources are acquired from the device for managing spectrum resources. The communication device utilizes the spectrum resources of the primary system in a condition of ensuring the communication quality of the primary system.

Figure 11:
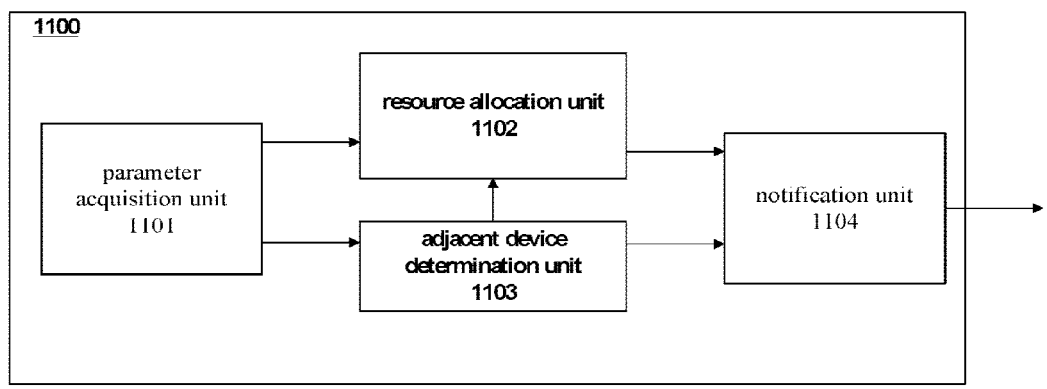
FIG. 11 is a block diagram illustrating the structure of a device for managing spectrum resources used in a radio reconfigurable communication system according to an embodiment of the disclosure.

FIG. 11 is a block diagram illustrating the structure of a device 1100 for managing spectrum resources in a radio reconfigurable communication system according to an embodiment of the disclosure. The device 1100 for managing spectrum resources 1100 includes a parameter acquisition unit 1101, a resource allocation unit 1102, an adjacent device determination unit 1103 and a notification unit 1104. The parameter acquisition unit 1101 acquires resource utilization parameter information of a communication device managed by the device 1100 for managing spectrum resources. The resource utilization parameter information includes geolocation information of the communication device. The resource allocation unit 1102 allocates spectrum resources of a primary system to the communication device, in a condition of ensuring the communication quality of the primary system, based on the resource utilization parameter information. The adjacent device determination unit 1103 determines communication devices adjacent to each other among communication devices managed by the device 1100 for managing spectrum resources based on the geolocation information. The notification unit 1104 notifies a resource allocation result determined by the resource allocation unit and geolocation information of the adjacent communication devices to a corresponding communication device. Optionally, the notification unit 1104 may notify geolocations of multiple adjacent communication devices and the resources assigned accordingly to the communication device. Alternatively, the notification unit 1104 may notify only geolocations of the adjacent communication devices, which use the overlapping spectrum resources, to the communication device.

Here, the notification unit 1104 may notify the possible nearby access points to the communication device in an ascending order of the path losses of the access points.

Corresponding to the description give referring to FIG. 9, the device 1100 for managing spectrum resources that provides the geolocation of the adjacent communication device may be replaced by the device for managing geolocation that does not perform the spectrum coordination. In other words, in this example, the spectrum utilization ratio is improved only by the interference elimination process of the communication device 900 without the optimization process at the initial resource allocation. For example, the device for managing geolocation provide, to the communication device 900, the geolocations of all or predetermined number (which is determined based on the empirical value) of adjacent communication devices, which use the overlapping resources, or the geolocations of all the adjacent communication devices and the spectrums used (especially in the scene with sparse arrangement), for the communication device 900 to perform the interference elimination process.

Preferably, the resource utilization parameter information further includes the number of antennas/the interference elimination capability of the communication device, and the notification unit 1104 may notify only the geolocation information of the adjacent communication devices, the number of which is less than the number of antennas, to the communication device, thereby reducing redundant information between the communication and the device for managing spectrum resources/the device for managing geolocations, and saving the signaling resources.

Figure 12:
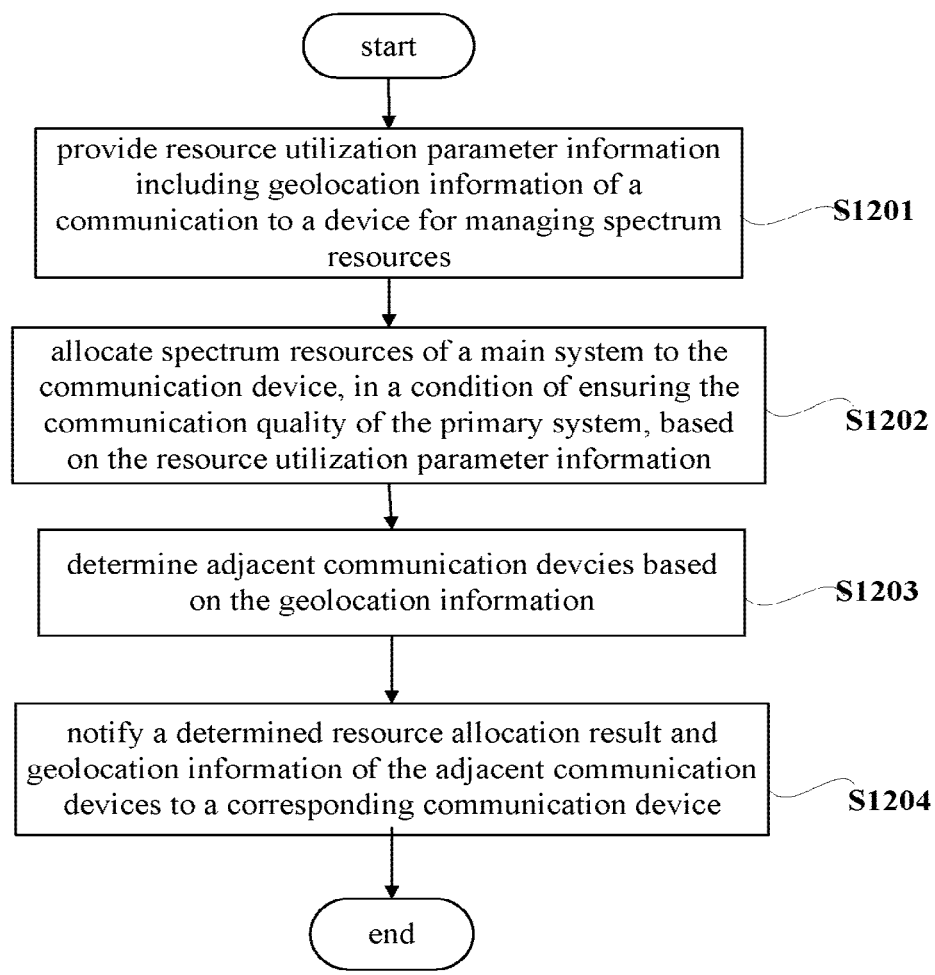
FIG. 12 is a flow chart illustrating a method of managing spectrum resources used in a radio reconfigurable communication system according to the disclosure.

FIG. 12 is a flow chart illustrating a method of managing spectrum resources in a radio reconfigurable communication system according to the disclosure. In step S1201, resource utilization parameter information of a managed communication device is acquired. The resource utilization parameter information includes geolocation information. In step S1202, spectrum resources of a primary system are allocated to the communication device, in a condition of ensuring the communication quality of the primary system, based on the resource utilization parameter information. In step S1203, communication devices adjacent to each other are determined among the managed communication devices based on the geolocation information. In step S1204, a determined resource allocation result and geolocation information of the adjacent communication devices are notified to a corresponding communication device. Optionally, geolocations of multiple adjacent communication devices and the resources assigned accordingly may be notified to the corresponding communication device. Alternatively, geolocations of only the adjacent communication devices, which use the overlapping spectrum resources, may be notified to the communication device.

Figure 13:
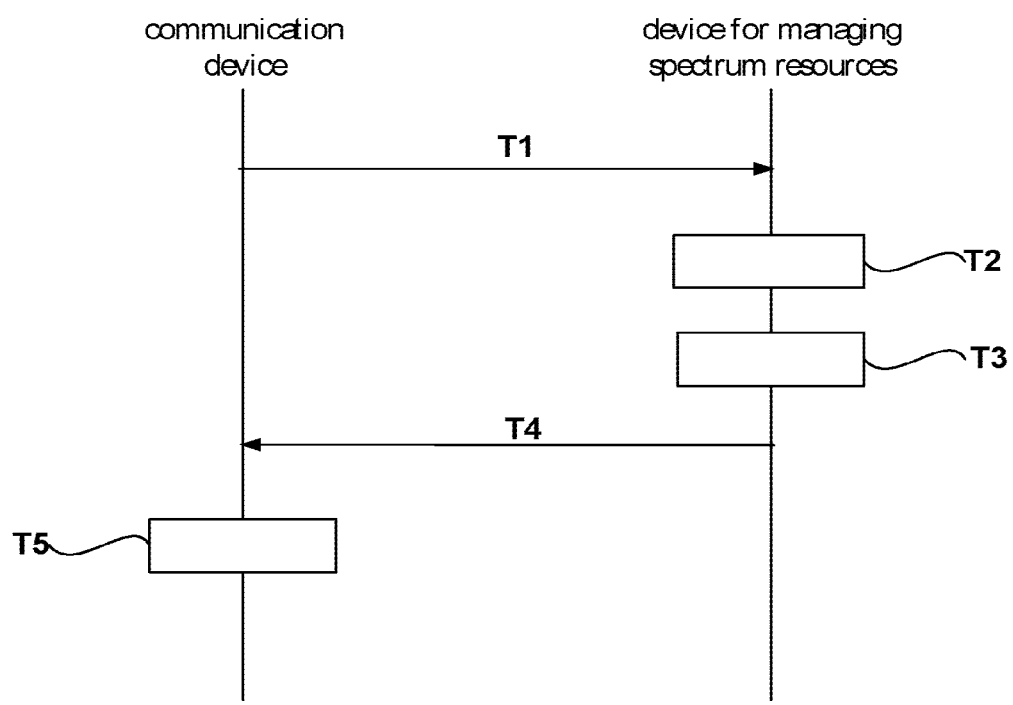
FIG. 13 is a sequence diagram illustrating interactions and actions between a communication device and a device for managing spectrum resources in a wireless communication system according to an embodiment of the disclosure.

A specific embodiment according to the disclosure will be described referring to FIG. 13. FIG. 13 is a sequence diagram illustrating interactions and actions between a communication device and a device for managing spectrum resources in a wireless communication system according to an embodiment of the disclosure.

The communication device according to an embodiment of the disclosure may include a transmission unit. At time T1, the transmission unit transmits information on a geolocation and the number of antennas of the communication device to a device for managing spectrum resources of the wireless communication system. The device for managing spectrum resources may include a parameter reception unit. The parameter reception unit is configured to receive, from a communication device, information on a geolocation and the number of antennas of the communication device.

The device for managing spectrum resources may further include a determination unit, a spectrum allocation unit and a transmission unit. At time T2, the determination unit may determine adjacent communication devices of the communication device according to the information on the geolocation and the number of antennas of the communication device. For example, in an embodiment, the determination unit may compare pre-estimated path loss values with a specific threshold and determine communication devices, the pre-estimated path loss values of which are less than the specific threshold, as possible adjacent communication devices. Further, the determination unit may sort the possible adjacent communication devices in an ascending order of the pre-estimated path loss values. In a case that the number of antennas of the communication device is M, the first M−1 communication devices are used as the adjacent communication devices if the total number of the possible adjacent communication devices is larger than M−1, and all the possible adjacent communication devices are used as the adjacent communication devices if the total number is smaller than or equal to M−1.

At time T3, the spectrum allocation unit may perform spectrum allocation according to the communication device and its adjacent communication devices. The specific spectrum allocation manner has been described above, and is not described hereafter.

At time T4, the transmission unit of the device for managing spectrum resources may transmit geolocations of the adjacent communication devices and an available spectrum to the communication device. For example, the transmission unit may transmit the geolocation information of the adjacent communication devices in an ascending order of the pre-estimated path losses of the communication devices.

The communication device may include a reception unit. The reception unit may be configured to receive, from the device for managing spectrum resources, information on geolocations of adjacent communication devices of the communication device and spectrums allocated to the communication device and the adjacent communication devices.

In an embodiment, the communication device may further include an interference channel calculation unit. At time T5, the interference channel calculation unit may calculate a corresponding interference channel based on the geolocations of the communication device and the adjacent communication device. For example, the interference channel calculation unit may calculate an arrival angle and a departure angle according to a relative direction between the communication device and the adjacent communication devices, and calculate vectors of uplink and downlink interference channels according to the arrival angle and the departure angle.

Hereinafter, several specific application scenes will be described in more detail by taking the application in the reconfigurable wireless system (RRS) as an example.

<First Scene>

In a reconfigurable wireless system, the device for managing spectrum resources according to an embodiment of the disclosure is implemented as a combination of a geolocation database (GLDB) and a spectrum coordinator (SC), and the communication device according to an embodiment of the disclosure is implemented as N adjacent access points (APs) of a cognitive radio system (CRS). The AP of the n-numbered CRS includes $M_n$ antennas, and serves $K_n$ UEs of single antenna. The system may perform steps as follows.

In ST1, each CRS reports the device parameters such as the geolocation of the AP of the system and $M_n$ to the SC.

In ST2, the SC reports the geolocation of each CRS to the GLDB.

In ST3, the GLDB transmits the available spectrum to the SC.

In ST4, the SC allocates the spectrums based on the geolocation of the CRS and the interference processing capability. The principle is that, the adjacent points with better interference elimination/pre-elimination capability are configured to share the spectrums in a case of overlapping adjacent point spectrums due to the restriction of the spectrum resources.

In ST5, the SC calculates path losses based on the geolocations of all the CRS and the geographical data that is stored previously, to find the co-frequency adjacent CRS of each CRS. The number of the co-frequency adjacent CRS $L_n$ meets $L_n \leq M_n - 1$.

In ST6, the SC transmits the sorting of the geolocation information of the co-frequency adjacent point to each CRS.

In ST7, the AP of each CRS calculates the interference channel based on the geolocation of the adjacent point.

In ST8, assuming that the uplink channel estimation matrix of $M_n \times K_n$ corresponding to the AP of the $CRS_n$ is $H^{ul}$, and the interference channel matrix of $M_n \times L_n$ consisting of the uplink interference channel is $H_i^{ul}$, where $M_n \geq K_n + L_n$, it is denoted that $$\tilde{H}^{ul} = [H^{ul}, H_i^{ul}] \quad (4),$$

where $\tilde{H}^{ul}$ is the matrix of $M \times (K_n + L_n)$, and the reception matrix Z of $(K_n + L_n) \times M$ is $$Z = \left[ (\tilde{H}^{ul})^H \tilde{H}^{ul} \right]^{-1} (\tilde{H}^{ul})^H, \quad (5)$$

$\hat{x} = Zy$ is calculated, and the first $K_n$ detection data are determined as the detection data after the interference elimination (which is referred as the zero-forcing algorithm).

Alternatively, in step ST8, assuming that the downlink channel estimation matrix of $K_n \times M_n$ corresponding to the AP of the $CRS_n$ is $H^{dl}$, and the interference channel matrix of $L_n \times M_n$ consisting of the downlink interference channel is $H_i^{dl}$, it is denoted that $$\tilde{H}^{dl} = \begin{pmatrix} H^{dl} \\ H_i^{dl} \end{pmatrix}, \quad (6)$$

where $\tilde{H}^{dl}$ is the matrix of $(K_n + L_n) \times M$, and the pre-coding matrix P is $$P = \frac{\tilde{P}}{\|\tilde{P}\|}, \tilde{P} = \left[ \tilde{H}^{dl} (\tilde{H}^{dl})^H \right]^{-1} (\tilde{H}^{dl})^H, \quad (7)$$

and the downlink transmission signal is a combination $\tilde{x}$ of the signal vector x of $1 \times K_n$ and the zero vector $0_{1 \times L_n}$ of $1 \times L_n$, $$\tilde{x} = \begin{pmatrix} x \\ 0_{1 \times L_n} \end{pmatrix}. \quad (8)$$

<Second Scene>

As another specific embodiment, in a reconfigurable wireless system, the device for managing spectrum resources according to an embodiment of the disclosure is implemented as a combination of a geolocation database (GLDB) and a spectrum coordinator (SC), and the communication device according to an embodiment of the disclosure is implemented as N adjacent access points (AP) of a cognitive radio system (CRS). The AP of the n-numbered CRS includes $M_n$ antennas, and serves $K_n$ UEs of single antenna. The system may perform steps as follows.

In ST1, each CRS reports the device parameters such as the geolocation of the AP of the system and the number of antennas to the SC and the GLDB.

In ST2, the GLDB transmits the available spectrum to the SC.

In ST3, the SC allocates the spectrums based on the geolocation of the CRS. The principle is that, the adjacent points with better interference elimination/pre-elimination capability are configured to share the spectrums, and it is ensured that the number of co-frequency adjacent CRS $L_n$ meets $L_n \leq M_n - 1$, in a case of overlapping adjacent point spectrums due to the restriction of the spectrum resources.

In ST4, the AP of each CRS measures the interference channel by receiving the pilot signal of the co-frequency adjacent CRS.

In ST5, the AP of each CRS performs the uplink interference elimination and the downlink interference pre-elimination based on the measured interference channel.

<Third Scene>

As another specific embodiment, in a reconfigurable wireless system, the device for managing spectrum resources according to an embodiment of the disclosure is implemented as a combination of a geolocation database (GLDB) and a spectrum coordinator (SC), and the communication device according to an embodiment of the disclosure is implemented as N adjacent access points (AP) of a cognitive radio system (CRS). The AP of the n-numbered CRS includes $M_n$ antennas, and serves $K_n$ UEs of single antenna. The system may perform steps as follows.

In ST1, each CRS reports the device parameters such as the geolocation of the AP of the system to the SC and the GLDB.

In ST2, the GLDB transmits the available spectrum to the SC.

In ST3, the SC allocates the spectrums based on the geolocation of the CRS. The principle is that, it is ensured that the spectrums of immediately adjacent points do not overlap.

In ST4, the SC calculates path losses based on the geolocations of all the CRS and the geographical data that is stored previously, to find the co-frequency adjacent CRS of each CRS. The number of the co-frequency adjacent CRS $L_n$ is an empirical value and is less than the number of antennas in the CRS AP.

In ST5, the SC transmits the sorting of the geolocation information of the adjacent point to each CRS.

In ST6, the AP of each CRS calculates the interference channel based on the geolocation of the adjacent point.

In ST7, the AP of each CRS performs the uplink interference elimination and the downlink interference pre-elimination based on the measured interference channel.

The disclosure has been described referring to the flow chart and/or block diagram of the method and device according to the embodiment of the disclosure. Each block in the flow chart and/or the block diagram and a combination of the blocks in the flow chart and/or the block diagram can be implemented in computer program instructions. These computer program instructions may be provided to a processor of a general purpose computer, a special purpose computer or other programmable data processing devices, so as to produce a machine, so that these instructions, when executed by the computer or other programmable data processing device, produce a device for achieving the functions/operations specified in the blocks in the flow chart and/or block diagram.

These computer program instructions may also be stored in computer readable mediums capable of instructing the computer or other programmable data processing device to operate in a specific mode. In this case, the instructions stored in the computer readable mediums produce an article of manufacture including an instruction means for achieving the functions/operations specified in the blocks in the flow chart and/or block diagram.

These computer program instructions may also be loaded onto the computer or other programmable data processing device, so that a series of operation steps are performed on the computer or other programmable data processing device, to produce a computer-implemented procedure, and thus the instructions executed on the computer or other programmable data processing device provide a procedure for achieving the functions/operations specified in the blocks in the flow chart and/or block diagram.

For example, in an embodiment, the device for managing spectrum resources may include one or more processors. The one or more processors are configured to: acquire resource utilization parameter information of a communication device managed by the device for managing spectrum resources, where the resource utilization parameter information includes the number of antennas of the communication device; and determine spectrum resource allocation to the communication device managed by the device for managing spectrum resources, based on the resource utilization parameter information.

In another embodiment, a communication device in a wireless communication system is configured with multiple antennas and includes one or more processors. The one or more processors are configured to: include, in resource utilization parameter information of the communication device, the number of antennas of the multiple antennas, to be used by a device for managing spectrum resources of the communication device; and acquire spectrum resources allocated by the device for managing spectrum resources based on the resource utilization parameter information.

It is to be understood that, the flow charts and the block diagrams in the figures illustrate architectures, functions and operations that can be implemented by the system, the method and the computer program product according to the embodiments of the disclosure. In this point, each block in the flow chart and the block diagram may represents one module, program segment or a part of code which contains one or more executable instructions for achieving the specified logical functions. It is also to be noted that, in some alternative implementations, the functions denoted in the blocks may be performed in an order different from that shown in the drawing. For example, two blocks shown to be connected may be performed in parallel, and sometimes may be performed in an opposite order, depending on the related function. It is also to be noted that, each block in the block diagram and/or flow chart and a combination of the blocks in the block diagram and/or flow chart may be implemented in a dedicated hardware-based system for performing the specified function or operation, or may be implemented in a combination of a dedicated hardware and computer instructions.

Figure 14:
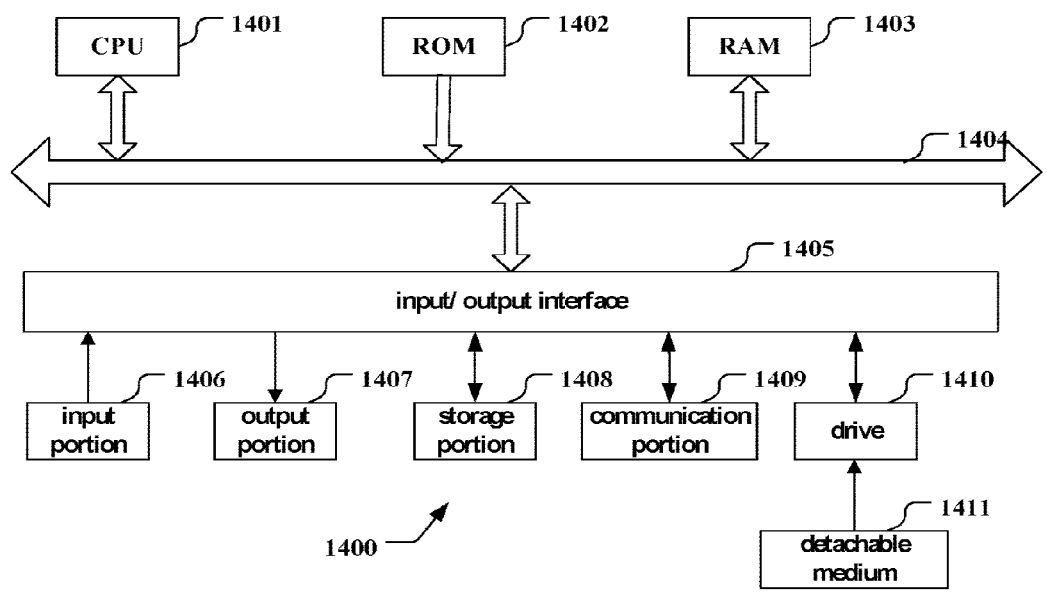
FIG. 14 is a block diagram illustrating an illustrative structure of a computer capable of implementing the invention.

FIG. 14 is a block diagram illustrating an illustrative structure of a computer capable of implementing the invention. In FIG. 14, the center processing unit (CPU) 1401 performs various processes based on the program stored in the read-only memory (ROM) 1402 or the program loaded onto the random access memory (RAM) 1403 from the storage portion 1408. In the RAM 1403, the data required when the CPU 1401 performs various processes is stored as necessary.

The CPU 1401, the ROM 1402 and the RAM 1403 are connected via the bus 1404. The input/output interface 1405 is also connected to the bus 1404.

Connected to the input/output interface 1405 are: the input portion 1406, including the keyboard, the mouse and the like; the output portion 1407, including the display, such as the cathode-ray tube (CRT) and the liquid crystal display (LCD), the speaker and the like; the storage portion 1408, including the hard disk and the like; and the communication portion 1409, including the network interface card, such as the LAN card and the modem. The communication portion 1409 performs communication processes via a network, such as the Internet.

The drive 1410 is also connected to the input/output interface 1405 as necessary. The detachable medium 1411, such as the magnetic disk, the optical disk, the magnetic-optical disk and the semiconductor memory, is mounted on the drive 1410 as necessary, so that the computer program read out therefrom is mounted into the storage portion 1408 as necessary.

In a case that the above steps and processes are implemented in software, the program constituting the software is mounted from the network, such as the Internet, or the storage medium, such as the detachable medium 1411.

It should be understood by those skilled in the art that the storage medium is not limited to the detachable medium 1411 shown in FIG. 14, in which the program is stored and which is distributed separately from the method to provide the user with the program. The example of the detachable medium 1411 includes the magnetic disk, the optical disk (including the CD read-only memory (CD-ROM) and the digital video disk (DVD)), the magnetic-optical disk (including the mini-card (MD)) and the semiconductor memory. Alternatively, the storage medium may be the ROM 1402, the hard disk contained in the storage portion 1408 and the like, in which the program is stored and which is distributed to the user together with the method including the same.

The base station according to the disclosure may be implemented as, for example, any type of evolution-type node B (eNB), such as a macro eNB and a small eNB. The small eNB may be an eNB which covers a cell smaller than the macro cell, such as a picocell, a micro eNB and a home (a femto) eNB. Alternatively, the base station may be implemented any other type of base station, such as a NodeB and a base transceiver station (BTS). The base station may include a main body configured to control the wireless communication (which is also referred to as a base station device); and one or more remote radio head (RRH) provided at positions different from the main body. Specifically, with the development of centralized/cooperative/cloud RAN (C-RAN), the main body for controlling the wireless communication described above may also be a processing device at a base band cloud, such as the server. Further, the various types of terminals described below may operate as a base station by temporarily or semi-persistently performing the function of the base station.

The user equipment according to the disclosure may be implemented as a mobile terminal (such as an intelligent phone, a tablet personal computer (PC), a notebook PC, an intelligent wearable device, a portable game console, and a portable/dongle-type mobile router and digital camera device) or an automobile-mounted terminal (such as the car navigation device). The user equipment may also be implemented as a terminal for performing machine to machine (M2M) communication (which is also referred to as a machine-type communication (MTC) terminal). Further, the user equipment may be a wireless communication module mounted on each of the above terminals (such as the integrated circuit module including a single wafer).

Hereinafter, the application examples of the base station and the user equipment are exemplified referring to FIG. 15 to FIG. 17.

In a specific scene, the device for managing spectrum resources according to the disclosure described above may be implemented for example in a macro base station. Especially in the LTE-U technique, for example, based on the disclosure, the macro base station may allocate the non-cellular communication resources to the small cell in the coverage of the macro base station. For example, the WiFi resources may be allocated to the small cell for use. Accordingly, on the side of the communication device (the small cell), the resource allocation instruction from the macro base station may be received and the resources that have been allocated to other systems may be used, for example, as a secondary carrier in the carrier aggregation technique. The macro base station and the small cell may be implemented in the eNB shown in FIG. 15 and FIG. 16.

Figure 15:
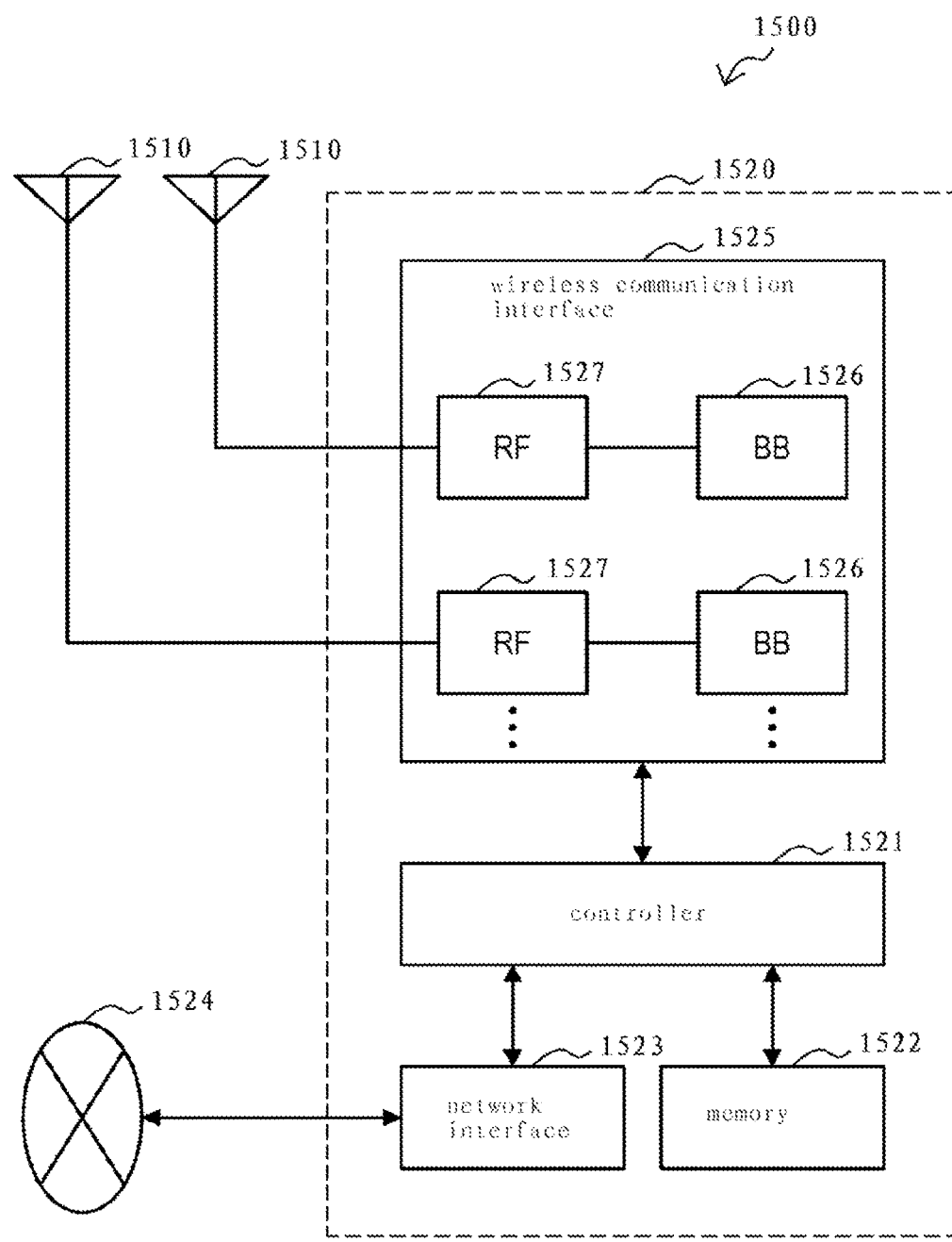
FIG. 15 is a block diagram illustrating a first example of an illustrative configuration of an eNB according to the disclosure.

FIG. 15 is a block diagram illustrating a first example of an illustrative configuration of an eNB according to the disclosure. The eNB 1500 includes one or more antenna 1510 and a base station device 1520. The base station device 1520 and each antenna 1510 may be connected via the RF cable.

Each of the antennas 1510 includes one or more antenna element (such as the multiple antenna elements in the multi-input multi-output (MIMO) antenna), and is used by the base station device 1520 to transmit and receive the wireless signal. As shown in FIG. 15, the eNB 1500 may include multiple antennas 1510. For example, the multiple antennas 1510 may be compatible with the multiple frequency bands used by the eNB 1500. Although FIG. 15 shows the example in which the eNB 1500 includes multiple antennas 1510, the eNB 1500 may include a single antenna 1510.

The base station device 1520 includes a controller 1521, a memory 1522, a network interface 1523 and a wireless communication interface 1525.

The controller 1521 may be for example a CPU or a DSP, and manipulates various high level functions of the base station device 1520. For example, the controller 1521 generates the data packet from the data in the signal processed by the wireless communication interface 1525, and transmits the generated packet via the network interface 1523. The controller 1521 may bundle the data from multiple base band processors to generate a bundled packet, and transmit the generated bundled packet. The controller 1521 may have the logical functions for performing the following control: the control may be such as the wireless resource control, the wireless bear control, mobility management, admission control and scheduling. The control may be performed in conjunction with the adjacent eNB or the core network node.

The memory 1522 includes a RAM and a ROM, and stores the program executed by the controller 1521 and various types of control data (such as a list terminals, the transmission power data and the scheduling data).

The network interface 1523 is a communication interface for connecting the base station device 1520 to the core network 1524. The controller 1521 may communicate with the core network node or another eNB via the network interface 1523. In this case, the eNB 1500 may be connected with the core network node or another eNB via the logical interface (such as the Si interface and the X2 interface). The network interface 1523 may also be a wired communication interface or a wireless communication interface for the wireless return path. If the network interface 1523 is a wireless communication interface, the network interface 1523 may use higher frequency band for wireless communication than the frequency band used by the wireless communication interface 1525.

The wireless communication interface 1525 supports any cellular communication scheme (such as the long-term evolution (LIE) and the LTE-advanced), and provides the wireless connection to the terminal in the cell located in the eNB 1500 via the antenna 1510. The wireless communication interface 1525 may generally include for example a baseband (BB) processor 1526 and a RF circuit 1527. The BB processor 1526 may perform for example coding/decoding, modulating/demodulating and multiplexing/de-multiplexing, and perform various types of signal processes of the layer (such as the L1, the medium access control (MAC), the radio link control (RLC) and packet data convergence protocol (PDCP)). Instead of the controller 1521, the BB processor 1526 may have some or all of the logical functions described above. The BB processor 1526 may be a memory for storing the communication control program, or may be a module including a processor configured to performing the program and the related circuit. The updating program may change the function of the BB processor 1526. This module may be a card or a blade inserted into the slot of the base station device 1520. Alternatively, this module may be a chip mounted on the card or the blade. The RF circuit 1527 may include for example a mixer, a filter and an amplifier, and transmit and receive the wireless signal via the antenna 1510.

As shown in FIG. 15, the wireless communication interface 1525 may include multiple BB processors 1526. For example, the multiple BB processors 1526 may be in compatible with the multiple frequency bands used by the eNB 1500. As shown in FIG. 15, the wireless communication interface 1525 may include multiple RF circuits 1527. For example, the multiple RF circuits 1527 may be compatible with the multiple antenna elements. Although FIG. 15 shows an example in which the wireless communication interface 1525 includes multiple BB processors 1526 and multiple RF circuits 1527, the wireless communication interface 1525 may include a single BB processor 1526 and a single RF circuit 1527.

Figure 16:
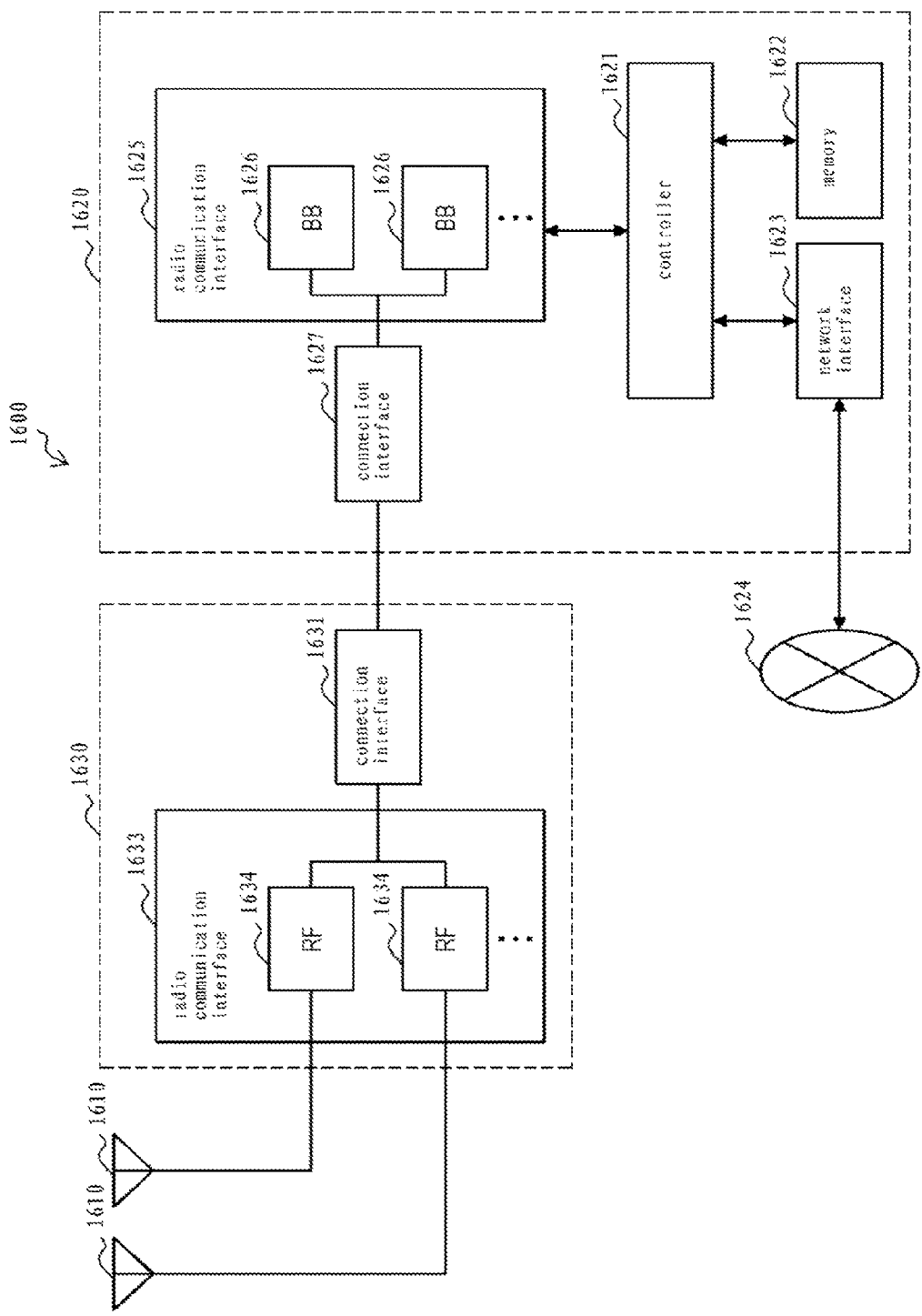
FIG. 16 is a block diagram illustrating a second example of an illustrative configuration of an eNB according to the disclosure.

FIG. 16 is a block diagram illustrating a second example of an illustrative configuration of an eNB according to the disclosure. The eNB 1600 includes one or more antenna 1610, a base station device 1620 and a RRH 1630. The RRH 1630 and each antenna 1610 may be connected via a RF cable. The base station device 1620 and the RRH 1630 may be connected via a high-speed line, such as the optical fiber cable.

Each of the antennas 1610 includes one or more antenna element (such as the multiple antenna elements in the MIMO antenna), and is used by the RRH 1630 to transmit and receive the wireless signal. As shown in FIG. 16, the eNB 1600 may include multiple antennas 1610. For example, the multiple antennas 1610 may be compatible with the multiple frequency bands used by the eNB 1600. Although FIG. 16 shows the example in which the eNB 1600 includes multiple antennas 1610, the eNB 1600 may include a single antenna 1610.

The base station device 1620 includes a controller 1621, a memory 1622, a network interface 1623, a wireless communication interface 1625 and a connection interface 1627. The controller 1621, the memory 1622 and the network interface 1623 are respectively the same as the controller 1321, the memory 1322 and the network interface 1323 described referring to FIG. 13. The network interface 1623 is used to connect the base station device 1620 to the core network 1624.

The wireless communication interface 1625 supports any cellular communication scheme (such as the LTE and the LTE-advanced), and provides the wireless connection to the terminal in the sector corresponding to the RRH 1630 via the RRH 1630 and the antenna 1610. The wireless communication interface 1625 may generally include for example a BB processor 1626. The BB processor 1626 is the same as the BB processor 1526 described referring to FIG. 15, except that the BB processor 1626 is connected to the RF circuit 1634 of the RRH 1630 via the connection interface 1627. As shown in FIG. 16, the wireless communication interface 1625 may include multiple BB processors 1626. For example, the multiple BB processors 1626 may be compatible with the multiple frequency bands used by the eNB 1600. Although FIG. 16 shows the example in which the wireless communication interface 1625 includes multiple BB processors 1626, the wireless communication interface 1625 may include a single BB processor 1626.

The connection interface 1627 is an interface for connecting the base station device 1620 (the wireless communication interface 1625) to the RRH 1630. The connection interface 1627 may also be a communication module for connecting the base station device 1620 (the wireless communication interface 1625) to the communication in the above high-speed line of the RRH 1630.

The RRH 1630 includes a connection interface 1631 and a wireless communication interface 1633.

The connection interface 1631 is an interface for connecting the RRH 1630 (the wireless communication interface 1633) to the base station device 1620. The connection interface 1631 may also be a communication module for the communication in the above high-speed line.

The wireless communication interface 1633 transmits and receives the wireless signal via the antenna 1610. The wireless communication interface 1633 may generally include for example a RF circuit 1634. The RF circuit 1634 may include for example a mixer, a filter and an amplifier, and transmit and receive the wireless signal via the antenna 1610. As shown in FIG. 16, the wireless communication interface 1633 may include multiple RF circuits 1634. For example, the multiple RF circuits 1634 may support multiple antenna elements. Although FIG. 16 shows the example in which the wireless communication interface 1633 includes multiple RF circuits 1634, the wireless communication interface 1633 may include a single RF circuit 1634.

In the eNB 1500 shown in FIG. 15 and the eNB 1600 shown in FIG. 16, the parameter acquisition unit 101 described in FIG. 1, the parameter acquisition unit 201 and the notification unit 204 described in FIG. 2, the acquisition unit 502 described in FIG. 5, the parameter reporting unit 201 and the acquisition unit 602 described in FIG. 6, the parameter reporting unit 901 and the acquisition unit 902 described in FIG. 9, and the parameter reporting unit 1101 and the notification unit 1104 described in FIG. 11 may be implemented by a combination of the wireless communication interface 1525 and the antenna 1510 of the eNB 1500 or the network interface 1523, or may be implemented by both the RRH 1630 of the eNB 1600 and the wireless communication interface 1625 of the base station device 1620 via the connection interface therebetween. For example, the allocation unit 102/202/1102, the adjacent device determination unit 203/1103, and the interference processing unit 603 may be implemented by the controller 1521 or the controller 1621.

The communication device according to the embodiment of the disclosure described above may be implemented as an intelligent phone. For example, the intelligent phone may open the WiFi hot point function to serve as a WiFi access device. The WiFi connection between the intelligent phone and other intelligent terminals utilizes the non-authorized spectrum resources. The utilization of the non-authorized spectrum resources by the intelligent phone is managed directly by for example the device for managing spectrum resources.

Figure 17:
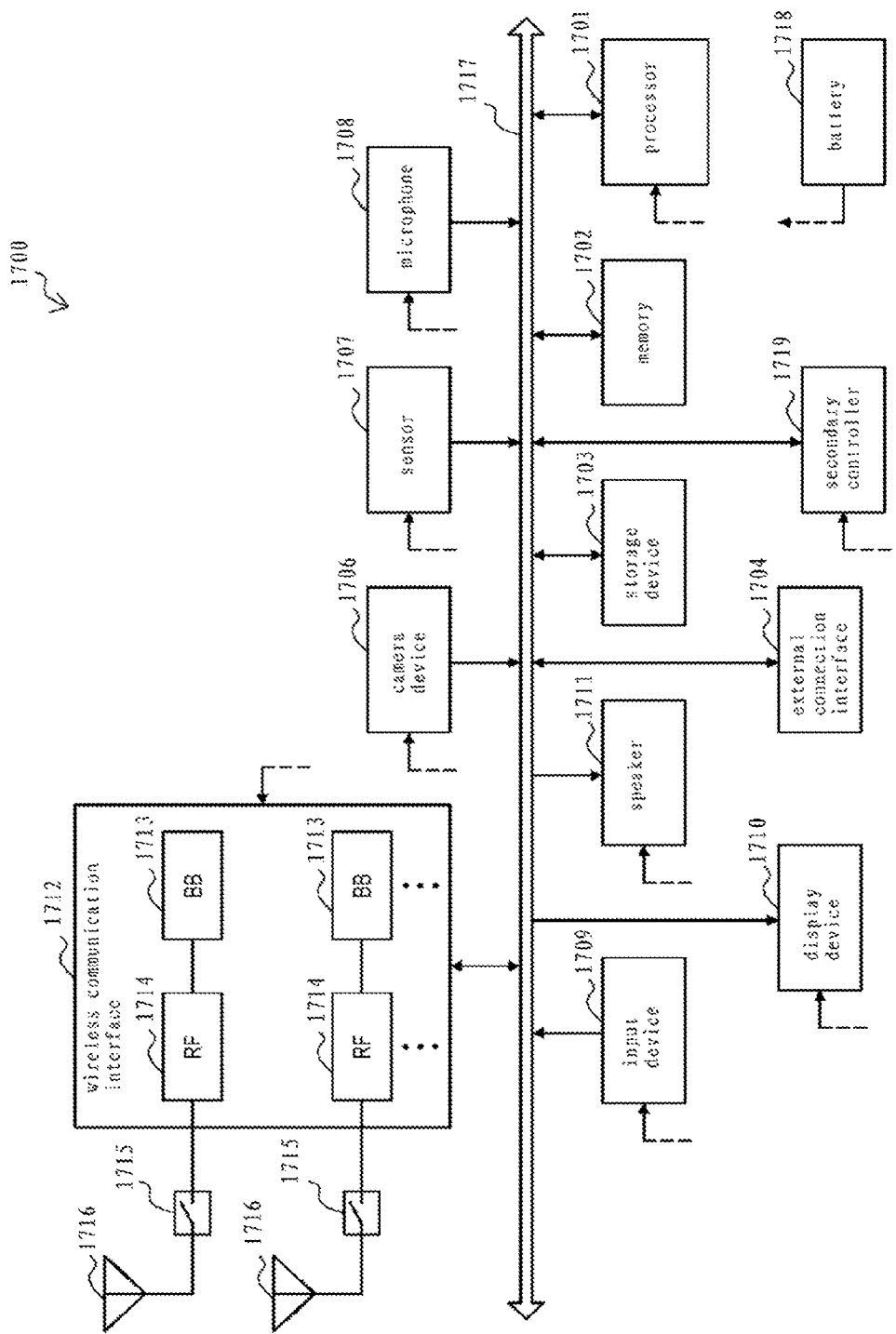
FIG. 17 is a block diagram illustrating an illustrative configuration of an intelligent phone to which the disclosure can be applied.

FIG. 17 is a block diagram illustrating an illustrative configuration in which an intelligent phone 1700 according to the disclosure can be applied. The intelligent phone 1700 includes a processor 1701, a memory 1702, a storage device 1703, an external connection interface 1704, a camera device 1706, a sensor 1707, a microphone 1708, an input device 1709, a display device 1710, a speaker 1711, a wireless communication interface 1712, one or more antenna switch 1715, one or more antenna 1716, a bus 1717, a battery 1718 and a secondary controller 1719.

The processor 1701 may be for example a CPU or a system on chip (SoC), and control the function of the application layer and another layer of the intelligent phone 1700. The memory 1702 includes a RAM and a ROM, and stores data and the program to be performed by the processor 1701. The storage device 1703 may include a storage medium, such as the semiconductor memory and the hard disk. The external connection interface 1704 is an interface used to connect an external device (such as the memory card and the universal serial bus (USB) device) to the intelligent phone 1700.

The camera device 1706 includes a picture sensor (such as the charge coupling device (CCD) and the Complementary Metal-Oxide-Semiconductor Transistor (CMOS)), and generates the capture image. The sensor 1707 may include a group of sensors, such as a measuring sensor, a gyroscope sensor, a geomagnetic sensor and an acceleration sensor. The microphone 1708 converts the voice input into the intelligent phone 1700 into an audio signal. The input device 1709 includes for example a touch sensor, a keypad, a keyboard, a button or a switch configured to detect the touch on the screen of the display device 1710, and receives the operation or information input from the user. The display device 1710 includes a screen (such as a liquid crystal display (LCD) and Organic Light Emitting Diode (OLED) display), and display an output picture of the intelligent phone 1700. The speaker 1711 converts the audio signal output from the intelligent phone 1700 into the sound.

The wireless communication interface 1712 supports any cellular communication scheme (such as the LIE and the LTE-advanced), and performs the wireless connection. The wireless communication interface 1712 may generally include for example a BB processor 1713 and a RF circuit 1714. The BB processor 1713 may perform for example coding/decoding, modulating/demodulating and multiplexing/de-multiplexing, and perform various types of signal processes for the wireless communication. The RF circuit 1714 may include for example a mixer, a filter and an amplifier, and transmit and receive the wireless signal via the antenna 1716. The wireless communication interface 1712 may be a chip module on which the BB processor 1713 and the RF circuit 1714 are integrated. As shown in FIG. 17, the wireless communication interface 1712 may include multiple BB processors 1713 and multiple RF circuits 1714. Although FIG. 17 shows the example in which the wireless communication interface 1712 includes multiple BB processors 1713 and multiple RF circuits 1714, the wireless communication interface 1712 may include a single BB processor 1713 and a single RF circuit 1714.

In addition to the cellular communication scheme, the wireless communication interface 1712 may support another type of wireless communication scheme, such as the short-distance wireless communication scheme, the near-field communication scheme and the wireless local area network (LAN) scheme. In this case, the wireless communication interface 1712 may include the BB processor 1713 and the RF circuit 1714 for each wireless communication scheme.

Each of the antenna switches 1715 switches the connection of the antenna 1716 between the multiple circuits (such as the circuits for different wireless communication schemes) in the wireless communication interface 1712.

Each of the antennas 1716 includes one or more antenna elements (such as the multiple antenna elements in the MIMO antenna), and is used by the wireless communication interface 1712 to transmit and receive the wireless signal. As shown in FIG. 17, the intelligent phone 1700 may include multiple antennas 1716. Although FIG. 17 shows the example in which the intelligent phone 1700 includes multiple antennas 1716, the intelligent phone 1700 may include a single antenna 1716.

In addition, the intelligent phone 1700 may include the antenna 1716 for each wireless communication scheme. In this case, the antenna switch 1715 may be omitted from the configuration of the intelligent phone 1700.

The bus 1717 is used to connect the processor 1701, the memory 1702, the storage device 1703, the external connection interface 1704, the camera device 1706, the sensor 1707, the microphone 1708, the input device 1709, the display device 1710, the speaker 1711, the wireless communication interface 1712 and the secondary controller 1719. The battery 1718 provides power to the various modules of the intelligent phone 1700 shown in FIG. 17 via the feeding line shown as a dotted line. The secondary controller 1719 manipulates the minimum necessary function of the intelligent phone 1700 in the sleep mode.

In the intelligent phone 1700 shown in FIG. 17, the interference processing unit 603 of the communication device 600 may be implemented by for example the processor 1701. The acquisition unit 502/602/902 and the parameter reporting unit 501/601/901 may be implemented by for example the wireless communication interface 1712 or a combination of the wireless communication interface 1712 and the antenna 1716.

It is to be understood that, the terms used herein are only used to describe the specific embodiments, but not intend to limit the invention. A singular form of "one" or "this" used herein aims to include the plural form, unless explicitly indicated otherwise in the context. It is further to be understood that, the word "contain", when used in the specification, indicates the presence of the specified feature, integral, step, operation, unit and/or component, but not exclude the presence or addition of one or more other feature, integral, step, operation, unit and/or component, or a combination thereof.

The invention has been described in conjunction with the specific embodiments in the specification above. However, it is to be understood by those skilled in the art that, various modifications and variations may be made without deviating from the scope of the invention as defined by the claims.

The techniques according to the disclosure may also be implemented by the following embodiments.

1. A device for managing spectrum resources in a wireless communication system, comprising:

a parameter acquisition unit configured to acquire resource utilization parameter information of a communication device managed by the device for managing spectrum resources, wherein the resource utilization parameter information comprises the number of antennas; and a resource allocation unit configured to determine spectrum resource allocation to the communication device based on the resource utilization parameter information.

2. The device for managing spectrum resources according to embodiment 1, wherein the resource allocation unit is configured to: determine, based on the number of antennas, interference elimination capability of the communication device, and determine, based on the interference elimination capability of the communication device, the number of other communication devices within the region where the communication device is located, which are enabled to use spectrum resources overlapping with those used by the communication device.

3. The device for managing spectrum resources according to embodiment 2, wherein the communication device can at most eliminate interference between the communication device and a part of the other communication devices, the number of which is the number of antennas minus 1.

4. The device for managing spectrum resources according to embodiment 1, wherein the resource allocation unit is configured to: determine other communication devices, the number of which is smaller than the number of antennas, from among communication devices managed by the device for managing spectrum resources, and allocates overlapping spectrum resources to the determined communication devices.

5. The device for managing spectrum resources according to any one of embodiments 1 to 4, wherein the resource allocation unit is further configured to determine, for a plurality of communication devices within a predetermined region, spectrum resource allocation to the plurality of communication devices, based on the smallest number of antennas among the numbers of antennas of the plurality of communication devices.

6. The device for managing spectrum resources according to any one of embodiments 1 to 4, wherein the device for managing spectrum is used in a radio reconfigurable communication system, the resource allocation unit allocates spectrum resources of a primary system to the communication device, in a condition of ensuring the communication quality of the primary system, to multiplex the spectrum resources; and wherein the resource utilization parameter information acquired by the parameter acquisition unit further comprises geolocation information, the resource allocation unit is configured to determine, based on the geolocation information, available spectrum resources of the communication device managed by the device for managing spectrum resources.

7. The device for managing spectrum resources according to embodiment 6, further comprising an adjacent device determination unit and a notification unit, wherein the adjacent device determination unit is configured to determine, based on the geolocation information, communication devices adjacent to each other among the communication devices managed by the device for managing spectrum resources, and the notification unit is configured to notify the available spectrum resources and the geolocation information of the adjacent communication devices to a corresponding communication device.

8. The device for managing spectrum resources according to embodiment 6 or 7, wherein the resource allocation unit is further configured to allocate the available spectrum resources to communication devices at adjacent geolocations based on the number of antennas.

9. The device for managing spectrum resources according to embodiment 8, wherein the resource allocation unit is configured to divide the available spectrum resources into a plurality of resource parts, and allocates the plurality of resource parts according to the number of antennas of each of the adjacent communication devices, in a case where the number of the adjacent communication device is larger than the number of antennas of one of the adjacent communication devices.

10. The device for managing spectrum resources according to embodiment 7, wherein the notification unit is configured to notify the geolocation information of the adjacent communication devices, the number of which is smaller than the number of antennas of the corresponding communication device, to the corresponding communication device.

11. A method for managing spectrum resources in a wireless communication system, comprising:
acquiring resource utilization parameter information of a communication device to be managed, wherein the resource utilization parameter information comprises the number of antennas; and
determining spectrum resource allocation to the communication device based on the resource utilization parameter information.

12. A communication device in a wireless communication system, configured with a plurality of antennas, the communication device comprising:
a parameter reporting unit configured to provide resource utilization parameter information of the communication device to a device for managing spectrum resources of the communication device, wherein the resource utilization parameter information comprises the number of the plurality of antennas; and
an acquisition unit configured to acquire spectrum resources allocated by the device for managing spectrum resources.

13. The communication device according to embodiment 12, further comprising:

an interference processing unit configured to determine an interference channel on the spectrum resources, and to perform interference processing using the plurality of antennas based on the interference channel.

14. The communication device according to embodiment 13, wherein the interference processing unit comprises an interference sensing unit configured to sense interference in a radio environment where the communication device is located, and to determine the interference channel based on a result of the sensing.

15. The communication device according to embodiment 13, wherein the acquisition unit is configured to acquire geolocation information of adjacent communication devices of the communication device from the device for managing spectrum resources, and
the interference processing unit comprises an interference calculation unit configured to calculate the interference channel based on the geolocation information of the adjacent communication devices and the configuration of the plurality of antennas.

16. The communication device according to any one of embodiments 13 to 15, wherein the interference processing unit comprises:
a transmitting matrix generation unit configured to generate at least one of an uplink receiving matrix and a downlink pre-coding matrix based on a user channel of a user equipment served by the communication device and the interference channel.

17. The communication device according to embodiment 16, wherein the communication device is a service node device, and the communication device further comprises a transmission unit configured to perform radio transmission with a corresponding user equipment using the spectrum resources according to at least one of the uplink receiving matrix and the downlink pre-coding matrix.

18. The communication device according to embodiment 13, wherein the interference processing unit chooses a part of the interference channels according to a channel condition and a scheduling state of a user equipment currently served by the communication device to perform the interference processing.

19. The communication device according to any one of embodiments 12 to 17, wherein the communication device is used in a radio reconfigurable communication system, the spectrum resources acquired by the acquisition unit is spectrum resources of a primary system, the communication device utilizes the spectrum resources in a condition of ensuring the communication quality of the primary system.

20. A wireless communication method in a communication device configured with a plurality of antennas, comprising:
providing resource utilization information of the communication device to a device for managing spectrum resources of the communication device, wherein the resource utilization parameter information comprises the number of the plurality of antennas; and
acquiring spectrum resources allocated by the device for managing spectrum resources.

21. A communication device in a radio reconfigurable communication system, comprising:
a parameter reporting unit configured to transmit resource utilization parameter information of the communication device to a device for managing spectrum resources of the communication device, wherein the resource utilization parameter information comprises geolocation information of the communication device; and an acquisition unit configured to acquire, from the device for managing spectrum resources, geolocation information of adjacent communication devices of the communication device and spectrum resources of a primary system allocated by the device for managing spectrum resources, wherein the communication device utilizes the spectrum resources of the primary system in a condition of ensuring the communication quality of the primary system.

22. A communication method in a radio reconfigurable communication system, comprising:

transmitting resource utilization parameter information of a communication device to a device for managing spectrum resources of the communication device, wherein the resource utilization parameter information comprises geolocation information of the communication device; and acquiring, from the device for managing spectrum resources, geolocation information of adjacent communication devices of the communication device and spectrum resources of a primary system allocated by the device for managing spectrum resources, wherein the communication device utilizes the spectrum resources of the primary system in a condition of ensuring the communication quality of the primary system.

23. A device for managing spectrum resources in a radio reconfigurable communication system, comprising:

a parameter acquisition unit configured to acquire resource utilization parameter information of a communication device managed by the device for managing spectrum resources, wherein the resource utilization parameter information comprises geolocation information;

a resource allocation unit configured to allocate spectrum resources of a primary system to the communication device, in a condition of ensuring the communication quality of the primary system, based on the resource utilization parameter information;

an adjacent device determination unit configured to determine communication devices adjacent to each other among communication devices managed by the device for managing spectrum resources based on the geolocation information; and a notification unit configured to notify a resource allocation result determined by the resource allocation unit and geolocation information of the adjacent communication devices to a corresponding communication device.

24. A method of managing spectrum resources in a radio reconfigurable communication system, comprising:

acquiring resource utilization parameter information of a managed communication device, wherein the resource utilization parameter information comprises geolocation information;

allocating spectrum resources of a primary system to the communication device, in a condition of ensuring the communication quality of the primary system, based on the resource utilization parameter information;

determining communication devices adjacent to each other among the managed communication devices based on the geolocation information, and notifying a determined resource allocation result and geolocation information of the adjacent communication devices to a corresponding communication device.

25. A communication device in a wireless communication system, comprising:

a transmission unit configured to transmit information on a geolocation and the number of antennas of the communication device to a device for managing spectrum resources of the wireless communication system.

26. The communication device according to embodiment 25, further comprising:

a reception unit configured to receive, from the device for managing spectrum resources, information on geolocations of adjacent communication devices of the communication device and spectrums allocated to the communication device and the adjacent communication devices.

27. The communication device according to embodiment 26, wherein the number of the adjacent communication devices is related to the number of antennas.

28. The communication device according to embodiment 26, further comprising:

an interference channel calculation unit configured to calculate a corresponding interference channel based on the geolocations of the communication device and the adjacent communication device.

29. The communication device according to embodiment 28, wherein the interference channel calculation unit calculates an arrival angle and a departure angle according to a relative direction between the communication device and the adjacent communication devices, and calculates vectors of uplink and downlink interference channels according to the arrival angle and the departure angle.

30. A device for managing spectrum resources in a wireless communication system, comprising:

a parameter reception unit configured to receive, from a communication device, information on a geolocation and the number of antennas of the communication device.

31. The device for managing spectrum resources according to embodiment 30, further comprising:

a determination unit configured to determine adjacent communication devices of the communication device according to the information on the geolocation and the number of antennas of the communication device;

a spectrum allocation unit configured to perform spectrum allocation according to the communication device and its adjacent communication devices; and a transmission unit configured to transmit geolocations of the adjacent communication devices and an available spectrum to the communication device.

32. The device for managing spectrum resources according to embodiment 31, wherein the determination unit compares pre-estimated path loss values with a specific threshold to determine communication devices, the pre-estimated path loss values of which are less than the specific threshold, as a possible adjacent communication devices.

33. The device for managing spectrum resources according to embodiment 32, wherein the determination unit sorts the possible adjacent communication devices in an ascending order of the pre-estimated path loss values, preceding M−1 communication devices are used as the adjacent communication devices if the total number of the possible adjacent communication devices is larger than M−1, and all the possible adjacent communication devices are used as the adjacent communication devices if the total number is smaller than or equal to M−1, where M is the number of antennas of the communication device.

34. The device for managing spectrum resources according to embodiment 33, wherein the transmission unit transmits the geolocation information of the adjacent communication devices in an ascending order of the pre-estimated path loss values.

35. A device for managing spectrum resources in a wireless communication system, comprising:

one or more processors configured to:

acquire resource utilization parameter information of a communication device managed by the device for managing spectrum resources, wherein the resource utilization parameter information comprises the number of antennas; and determine spectrum resource allocation to the communication device managed by the device for managing spectrum resources, based on the resource utilization parameter information.

36. A communication device in a wireless communication system, configured with a plurality of antennas, the communication device comprising:
one or more processors configured to:
comprise, in resource utilization parameter information of the communication device, the number of antennas of the plurality of antennas, to be used by a device for managing spectrum resources of the communication device; and
acquire spectrum resources allocated by the device for managing spectrum resources based on the resource utilization parameter information.

The invention claimed is:

1. A device for managing spectrum resources in a wireless communication system, comprising:
circuitry configured to:
acquire resource utilization parameter information of a communication device managed by the device for managing spectrum resources, wherein the resource utilization parameter information comprises a number of antennas of the communication device;
receive information from a central server indicating available spectrum resources for the communication device;
determine, based on the number of antennas, interference elimination capability of the communication device; and
determine, based on the determined interference elimination capability of the communication device, spectrum resource allocation of the available spectrum resources to the communication device;
wherein the circuitry is configured to determine the interference elimination capability based on the number of antennas that corresponds to spatial freedom degrees for processing interference, and to determine the spectrum resource allocation to the communication device further based on a number of other communication devices within a region where the communication device is located, which are enabled to use spectrum resources overlapping with those used by the communication device.

2. The device for managing spectrum resources according to claim 1, wherein the circuitry is configured to determine the interference elimination capability of the communication device corresponds to eliminating at most interference between the communication device and a number of other communication devices within a region where the communication device is located, the number of the other communication devices is the number of antennas minus 1.

3. The device for managing spectrum resources according to claim 1, wherein the circuitry is configured to:
determine other communication devices from among communication devices managed by the device for managing spectrum resources, a number of the other communication devices is smaller than the number of antennas; and
allocates allocate overlapping spectrum resources to the determined other communication devices.

4. The device for managing spectrum resources according to claim 1, wherein the circuitry is further configured to:
determine, for a plurality of communication devices within a predetermined region, spectrum resource allocation to the plurality of communication devices, based on a smallest number of antennas among respective numbers of antennas of the plurality of communication devices.

5. The device for managing spectrum resources according to claim 1, wherein
the device for managing spectrum is a spectrum coordinator used in a radio reconfigurable communication system,
the central server is a geolocation database,
the circuitry is configured to allocate the available spectrum resources determined by the geolocation database to the communication device and other communication devices managed by the device for managing spectrum resources by multiplexing the available spectrum resources among the communication device and the other communication devices,
the resource utilization parameter information further comprises geolocation information, and
the geolocation database is configured to receive the geolocation information from the device for managing spectrum resources and to determine the available spectrum resources based on the geolocation information.

6. The device for managing spectrum resources according to claim 5, wherein the circuitry is configured to:
determine, based on the geolocation information, communication devices adjacent to each other among the communication devices managed by the device for managing spectrum resources; and
notify a corresponding communication device the available spectrum resources and the geolocation information of the adjacent communication devices.

7. The device for managing spectrum resources according to claim 5, wherein the circuitry is further configured to allocate the available spectrum resources to communication devices at adjacent geolocations based on the number of antennas.

8. The device for managing spectrum resources according to claim 7, wherein the circuitry is configured to:
divide the available spectrum resources into a plurality of resource parts; and
allocate the plurality of resource parts according to the number of antennas of each of the adjacent communication devices, in a case where the number of the adjacent communication device is larger than the number of antennas of one of the adjacent communication devices.

9. The device for managing spectrum resources according to claim 6, wherein the circuitry is configured to notify the corresponding communication device of the geolocation information of the adjacent communication devices, where the number of the adjacent communication devices is smaller than the number of antennas of the corresponding communication device.

10. A method for managing spectrum resources in a wireless communication system, comprising:
acquiring resource utilization parameter information of a communication device to be managed, wherein the resource utilization parameter information comprises a number of antennas of the communication device;
receiving information from a central server indicating available spectrum resources for the communication device;
determining, based on the number of antennas, interference elimination capability of the communication device; and determining, based on the determined interference elimination capability of the communication device, spectrum resource allocation of the available spectrum resources to the communication device;

wherein the determining the interference elimination capability of the communication device is performed based on the number of antennas that corresponds to spatial freedom degrees for processing interference, and the determining the spectrum resource allocation to the communication device is performed further based on a number of other communication devices within a region where the communication device is located, which are enabled to use spectrum resources overlapping with those used by the communication device.

11. A communication device in a wireless communication system, the communication device comprising:
a plurality of antennas; and
circuitry configured to:
provide resource utilization parameter information of the communication device to a device for managing spectrum resources of the communication device, wherein the resource utilization parameter information comprises a number of the plurality of antennas of the communication device; and
acquire, from the device for managing spectrum resources, spectrum resources allocation of available spectrum resources allocated by the device for managing spectrum resources, the available spectrum resources being indicated by a central server, the spectrum resources allocation being determined based on interference elimination capability of the communication device, which is determined based on the number of the plurality of antennas;
wherein the circuitry is configured to acquire the spectrum resources allocation of available spectrum resources that is determined based on the interference elimination capability of the communication device, and based on a number of other communication devices within a region where the communication device is located, which are enabled to use spectrum resources overlapping with those used by the communication device, and
the interference elimination capability is determined based on the number of the plurality of antennas that corresponds to spatial freedom degrees for processing interference.

12. The communication device according to claim 11, wherein the circuitry is configured to:
determine an interference channel on the spectrum resources; and
perform interference processing using the plurality of antennas based on the interference channel.

13. The communication device according to claim 12, wherein the circuitry is configured to:
sense interference in a radio environment where the communication device is located; and
determine the interference channel based on a result of the sensing.

14. The communication device according to claim 12, wherein the circuitry is configured to:
acquire geolocation information of adjacent communication devices from the device for managing spectrum resources; and
calculate the interference channel based on the geolocation information of the adjacent communication devices and a configuration of the plurality of antennas.

15. The communication device according to claim 12, wherein the circuitry is configured to:
generate at least one of an uplink receiving matrix and a downlink pre-coding matrix based on a user channel of a user equipment served by the communication device and the interference channel.

16. The communication device according to claim 12, wherein the circuitry is configured to choose a part of the interference channel according to a channel condition and a scheduling state of a user equipment currently served by the communication device to perform the interference processing.

17. A wireless communication method for a communication device that includes a plurality of antennas, the method comprising:
providing resource utilization information of the communication device to a device for managing spectrum resources of the communication device, wherein the resource utilization parameter information comprises a number of the plurality of antennas of the communication device; and
acquiring, from the device for managing spectrum resources, spectrum resources allocation of available spectrum resources allocated by the device for managing spectrum resources, the available spectrum resources being indicated by a central server, the spectrum resources allocation being determined based on interference elimination capability of the communication device, which is determined based on the number of the plurality of antennas;
wherein the acquiring the spectrum resources allocation of available spectrum resources comprises acquiring the spectrum resources allocation of available spectrum resources that is determined based on the interference elimination capability of the communication device, and based on a number of other communication devices within a region where the communication device is located, which are enabled to use spectrum resources overlapping with those used by the communication device, and
the interference elimination capability is determined based on the number of the plurality of antennas that corresponds to spatial freedom degrees for processing interference.

18. A device for managing spectrum resources in a wireless communication system, comprising:
one or more processors configured to:
acquire resource utilization parameter information of a communication device managed by the device for managing spectrum resources, wherein the resource utilization parameter information comprises a number of antennas of the communication device;
receive information from a central server indicating available spectrum resources for the communication device;
determine, based on the number of antennas, interference elimination capability of the communication device; and
determine, based on the determined interference elimination capability of the communication device, spectrum resource allocation of the available spectrum resources to the communication device;
wherein the determining the interference elimination capability of the communication device is performed based on the number of antennas that corresponds to spatial freedom degrees for processing interference, and the determining the spectrum resource allocation to the communication device is performed further based on a number of other communication devices within a region where the communication device is located, which are enabled to use spectrum resources overlapping with those used by the communication device.

19. A communication device in a wireless communication system, the communication device comprising:
a plurality of antennas; and
one or more processors configured to:
provide, in resource utilization parameter information of the communication device, a number of antennas of the plurality of antennas of the communication device, to be used by a device for managing spectrum resources of the communication device; and
acquire, from the device for managing spectrum resources, spectrum resources allocation of available spectrum resources allocated by the device for managing spectrum resources, the available spectrum resources being indicated by a central server, the spectrum resources allocation being determined based on interference elimination capability of the communication device, which is determined based on the number of the plurality of antennas;
wherein the acquiring the spectrum resources allocation of available spectrum resources comprises acquiring the spectrum resources allocation of available spectrum resources that is determined based on the interference elimination capability of the communication device, and based on a number of other communication devices within a region where the communication device is located, which are enabled to use spectrum resources overlapping with those used by the communication device, and
the interference elimination capability is determined based on the number of the plurality of antennas that corresponds to spatial freedom degrees for processing interference.

* * * * *